United States Patent
Kinoshita et al.

(10) Patent No.: US 6,914,789 B2
(45) Date of Patent: Jul. 5, 2005

(54) SWITCHING POWER SUPPLY APPARATUS WITH BLANKING PULSE GENERATOR

(75) Inventors: Tomoko Kinoshita, Takatsuki (JP); Yoshihiro Mori, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 17 days.

(21) Appl. No.: 10/742,392

(22) Filed: Dec. 22, 2003

(65) Prior Publication Data

US 2004/0136206 A1 Jul. 15, 2004

(30) Foreign Application Priority Data

Dec. 25, 2002 (JP) ........................................ 2002-373325

(51) Int. Cl.[7] .............................................. H02M 3/335
(52) U.S. Cl. ...................................... 363/21.12; 363/97
(58) Field of Search .......................... 363/21.12, 21.13, 363/56.01, 97; 323/299

(56) References Cited

U.S. PATENT DOCUMENTS 5,793,623 A * 8/1998 Kawashima et al. ..... 363/56.05
5,856,917 A * 1/1999 Aonuma et al. ......... 363/21.04
6,130,826 A * 10/2000 Matsumoto ............... 363/21.15
6,667,604 B2 * 12/2003 Yanagisawa ................. 323/274
6,714,425 B2 * 3/2004 Yamada et al. .......... 363/21.12

FOREIGN PATENT DOCUMENTS

| JP | 10-112975 | 4/1998 |
| JP | 2001-346378 | 12/2001 |
| JP | 2002-078333 | 3/2002 |
| JP | 2002-112538 | 4/2002 |

* cited by examiner

Primary Examiner—Bao Q. Vu
(74) Attorney, Agent, or Firm—Parkhurst & Wendel, L.L.P.

(57) ABSTRACT

A switching power supply apparatus is provided, wherein an optimal blanking interval can be obtained for an entire load range. The switching power supply apparatus is configured such that an on-blanking pulse signal generating circuit 31 generates a blanking pulse signal based on an error voltage signal VEAO, and sets a blanking interval that corresponds to the load condition. For example, the reference voltage and the voltage value of the error voltage signal VEAO are compared and the blanking pulse signal that shortens the blanking interval is generated during a light load, that is, when the voltage value of the error voltage signal VEAO is less than or equal to the reference voltage.

7 Claims, 13 Drawing Sheets

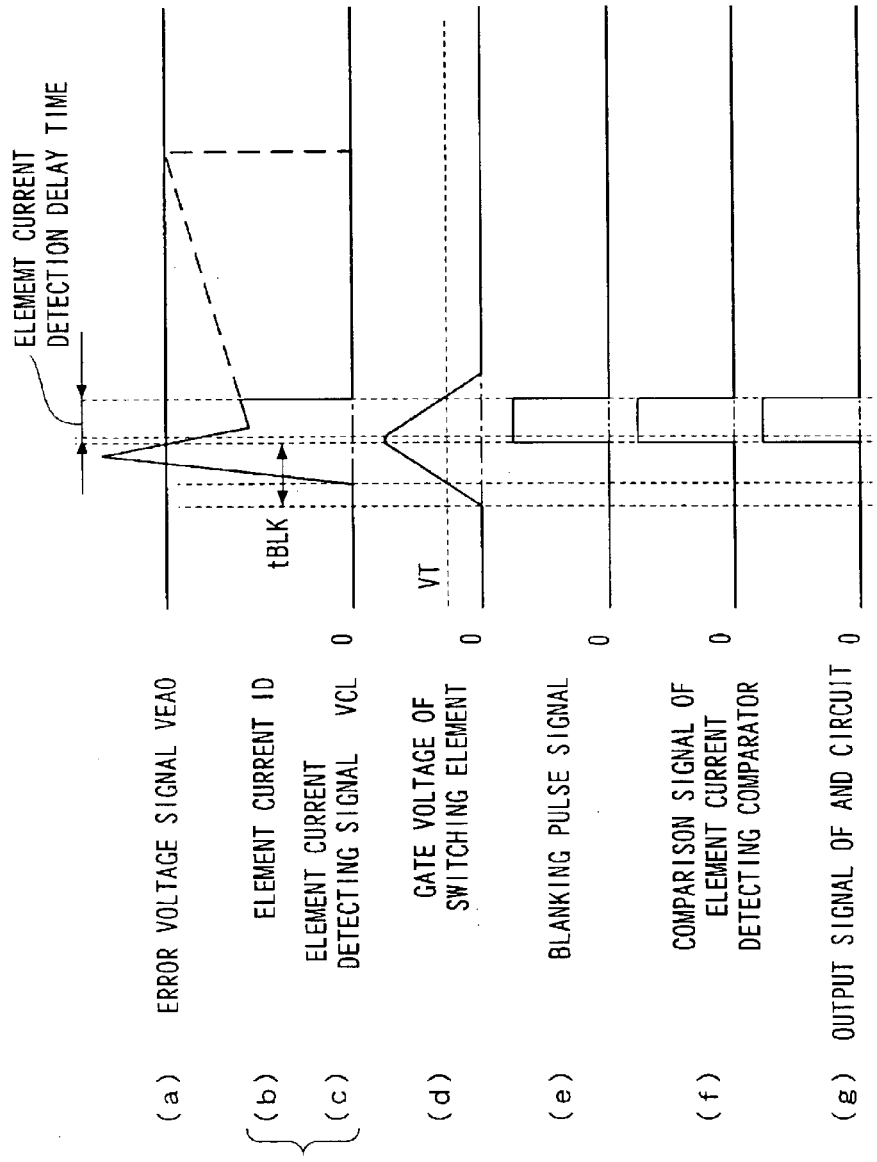

SWITCHING POWER SUPPLY APPARATUS WITH BLANKING PULSE GENERATOR

BACKGROUND OF THE INVENTION

1. Field of the Invention

The present invention relates to a switching power supply apparatus.

2. Related Art

A conventional switching power supply is described below with reference to the diagrams. FIG. 8 is a circuit diagram showing an outline of a conventional insulating-type switching power supply apparatus in which the input side and the output side are electrically insulated.

The switching power supply apparatus is configured such that AC electric power applied to a main input terminal 101 from a commercial power supply or the like, for example, is rectified by a rectifier 102 comprising a diode bridge or the like, smoothed by an input capacitor 103, and applied as DC voltage Vin to a first primary winding 104a of a transformer 104 for electric power conversion, as shown in FIG. 8. This primary winding 104a is connected to a switching element 105 comprising an N-type power MOSFET or the like, for example, and the switching power supply apparatus generates an electromotive force by way of magnetic induction in a secondary winding 104c of the transformer 104 by causing the switching element 105 to perform switching action. The switching power supply apparatus then rectifies and smoothes, by means of an output capacitor 108 and a diode 107 connected to the secondary winding 104c, the AC electric power from the electromotive force that is produced in the secondary winding 104c, and supplies the power to a load 110 connected to a main output terminal 109 as the DC power of output voltage Vo.

The dotted line 120 in FIG. 8 represents a semiconductor device. The semiconductor device comprises the switching element 105 and a control circuit 106 for controlling the switching action of the switching element 105; and has three terminals, namely, a drain terminal TD and a source terminal TS for the switching element 105, and a control terminal TC for the control circuit 106.

A second primary winding (hereinafter referred to as auxiliary winding) 104b is provided to the transformer 104. Electromotive force is produced in the auxiliary winding 104b by way of magnetic induction through the switching action of the switching element 105, in the same manner as the secondary winding 104c.

The auxiliary power supply circuit 111 comprising a diode 112 and an output capacitor 113 rectifies and smoothes the AC electric power from the electromotive force that is generated in the auxiliary winding 104b, and outputs this power as an auxiliary power supply voltage Vcc.

This auxiliary power supply voltage Vcc is input to the control terminal TC. The control circuit 106 uses this auxiliary power supply voltage Vcc as a drive signal, and also uses this voltage as a feedback signal for stabilizing the output voltage Vo because the auxiliary power supply voltage Vcc and the output voltage Vo are proportional to the winding ratio of the auxiliary winding 104b and the secondary winding 104c. In other words, the control circuit 106 controls the switching action of the switching element 105 on the basis of the auxiliary power supply voltage Vcc so that the output voltage Vo remains stable at a prescribed voltage.

The control circuit 106 is described below.

An oscillator 121 first generates a switching signal for inducing a switching action (a repeating ON/OFF action) in the switching element 105. In other words, the oscillator 121 generates and outputs a signal CLK for determining the switching frequency of the switching element 105, and a maximum duty cycle signal MDC for determining the maximum duty cycle of the switching element 105.

An error amplifier 122 further generates and outputs an error voltage signal VEAO that is the voltage value that corresponds to the difference between the auxiliary power supply voltage Vcc and the reference voltage. More specifically, when the auxiliary power supply voltage Vcc that is input to the control terminal TC and resistively divided falls below the prescribed reference voltage that is set in advance, the error amplifier 122 generates and outputs the error voltage signal VEAO comprising this difference to an element current detecting comparator 124. The voltage of the error voltage signal VEAO decreases as the auxiliary power supply voltage Vcc increases, and increases as the auxiliary power supply voltage Vcc decreases.

The element current detecting circuit 123 detects the element current ID that flows from the primary winding 104a of the transformer 104 to the switching element 105, converts the result into a voltage signal that corresponds to the current value thereof, and outputs the result to the element current detecting comparator 124 as an element current detecting signal VCL.

The element current detecting comparator 124 compares the voltage of the element current detecting signal VCL and the error voltage signal VEAO; and the amount of current that flows into the switching element 105 is adjusted and the output voltage Vo stabilized at a prescribed voltage by generating and outputting a comparison signal for turning off the switching element 105 on the basis of this comparison result. More specifically, the element current detecting signal 124 outputs a HIGH signal (The electric potential is a high-level signal, and the same applies hereinafter.) to the one of the input terminals of the AND circuit 130 when the switching element 105 is turned on, and the voltage of the element current detecting signal VCL increases and becomes equivalent to the voltage of the error voltage signal VEAO. The switching element 105 is turned off when this HIGH signal is input to the RESET terminal of an RS flip-flop circuit 126 that is described below.

The switching signal control circuit 125 comprises the RS flip-flop circuit 126, a NAND circuit 127, and a gate driver 128. The RS flip-flop circuit 126 receives a clock signal CLK that is output from the oscillator 121 to the SET terminal, and receives a signal that is output from the AND circuit 130 to the RESET terminal. The NAND circuit 127 receives a maximum duty cycle signal MDC that is output from the oscillator 121 to one of the input terminals, and receives a signal that is output from the RS flip-flop circuit 126 to the other input terminal. The gate driver 128 receives a signal that is output from the NAND circuit 127, inverts and amplifies this, and outputs a control signal to the switching element 105.

The switching element control circuit 125 controls the ON interval of the switching element 105 by controlling the switching signal on the basis of the comparison signal (the output signal from the AND circuit 130) from the element current detecting comparator 124. In other words, the switching signal control circuit 125 controls the switching signal so that the switching element 105 is turned off when the voltage of the error voltage signal VEAO and the voltage of the element current detecting signal VCL are equal and the comparison signal from the element current detecting comparator 124 is a HIGH signal.

Thus, the control circuit 106, with the auxiliary power supply voltage Vcc that is proportional to the output voltage Vo supplied to the load 110 serving as the feedback signal, controls the element current ID that flows from the primary winding 104a of the transformer 104 to the switching element 105 by controlling the ON interval (the OFF interval) of the switching element 105, and ensures that the output voltage Vo remains stable at a prescribed voltage.

An excess current protecting circuit 129 clamps the maximum voltage value of the error voltage signal VEAO that is output from the error amplifier 122, and prevents excess current from flowing to the switching element 105.

An on-blanking pulse generating circuit 131 that is connected to the other terminal of the AND circuit 130 is subsequently described.

The on-blanking pulse generating circuit 131 outputs a blanking pulse signal that disables the comparison signal from the element current detecting comparator 124 for a fixed interval of time (hereinafter referred to as the "blanking interval") after the switching circuit 105 has been turned on. The on-blanking pulse generating circuit 131 ensures with the aid of this blanking pulse signal that the switching element 105 is not turned off by a capacitive spike current. More specifically, the on-blanking pulse generating circuit 131 outputs to the AND circuit 130 a blanking pulse signal that is a LOW (a signal that has a low electric potential; same below) signal during the blanking interval, and a HIGH signal after the blanking interval has elapsed.

Thus, the on-blanking pulse generating circuit 131 prevents the oscillation of the switching element 105 from being halted by a capacitive spike current. In other words, because a capacitive spike current is generated and the electric potential of the element current detecting signal VCL that is output from the element current detecting circuit 123 increases sharply when the switching element 105 is turned on, the electric potential of the element current detecting signal VCL and the error voltage signal VEAO become equivalent immediately after turn on, and the element current detecting comparator 124 outputs a HIGH signal. As a result, were the control circuit 106 to be configured so that the comparison signal from the element current detecting comparator 124 is directly input to the RESET terminal of the RS flip-flop circuit 126, the switching element 105 would be turned off immediately after being turned on, and the oscillation of the switching element 105 would be halted. In view of the above, with this switching power supply apparatus, the comparison signal from the element current detecting comparator 124 is prevented from being input to the RESET terminal of the RS flip-flop circuit 126 by the AND circuit 130 and the on-blanking pulse generating circuit 131 while the capacitive spike current is being produced.

The constitution of the on-blanking pulse generating circuit 131 is described below.

A blanking interval generating capacitor 140 is connected between the ground of the control circuit 106 and the input terminal of an inverter 141, as shown in FIG. 8. The inverter 141 outputs a blanking pulse signal that is a LOW signal while the electric potential of the blanking interval generating capacitor 140 is higher than a threshold value voltage, and a HIGH signal when the threshold value voltage is reached.

A P-type transistor 142 and an N-type transistor 143 form an inverting circuit wherein the drain terminals are connected together, a control signal from the gate driver 128 is input to the gate terminals, and the opening and closing thereof are inverted in accordance with this control signal. In other words, when a control signal (HIGH signal) for turning on the switching element 105 is received from the gate driver 128, the P-type transistor 142 is turned off and the N-type transistor 143 is turned on. Conversely, when a control signal (LOW signal) for turning off the switching element 105 is received from the gate driver 128, the P-type transistor 142 is turned on and the N-type transistor 143 is turned off.

The blanking interval generating capacitor 140 is connected to the connecting portion (between the drain terminals) of the P-type transistor 142 and an N-type transistor 143.

A mirror circuit 145 comprises N-type transistors 146 and 147. A constant current source 144 is a constant current source for lowering the electric potential of the blanking interval generating capacitor 140. The constant current source 144 is connected to the N-type transistor 146, and the source terminal N-type transistor 143 is connected to the N-type transistor 147.

The operation of the on-blanking pulse generating circuit 131 is described below.

When the switching element 105 is turned on, a HIGH signal is output from the gate driver 128, the P-type transistor 142 is turned off, and the N-type transistor 143 is turned on. As a result, current that is proportional to the current that flows in the constant current source 144 flows to the N-type transistor 147 by way of the blanking interval generating capacitor 140 due to the mirror effect, and the electric potential of the blanking interval generating capacitor 140 decreases. A HIGH signal is output from the inverter 141 when the electric potential of the blanking interval generating capacitor 140 reaches the threshold value voltage of the inverter 141.

After this switching element 105 is turned on (after a HIGH signal is output from the gate driver 128), the interval of time until the electric potential of the blanking interval generating capacitor 140 reaches the threshold value voltage of the inverter 141 is the blanking interval, and the inverter 141 outputs a LOW signal during this time. The blanking interval is a fixed interval that is determined by the capacitance of the blanking interval generating capacitor 140, the threshold value set by the inverter 141, and the current value of the constant current source 144.

When the switching element 105 is thereafter turned off (when a LOW signal is output from the gate driver 128), the P-type transistor 142 is turned on, the N-type transistor 143 is turned off, current flows into the blanking interval generating capacitor 140, and the electric potential thereof increases. When the electric potential of the blanking interval generating capacitor 140 then reaches the threshold value voltage of the inverter 141, a LOW signal is output from the inverter 141.

Thus, in the switching power supply apparatus, the oscillation of the switching element is prevented from being halted by a capacitive spike current that is produced when the switching element is turned on, by means of the on-blanking interval generating circuit 131 that generates a blanking pulse signal, which is a LOW signal during the blanking interval and a HIGH signal after the blanking interval has elapsed.

Operation during a load change in the switching power supply device is subsequently described with reference to the timing chart shown in FIG. 9. FIG. 9 is a timing chart of when the load changes from a constant-load condition to a no-load condition or a light-load condition (condition in which the amount of current that flows from the output capacitor 108 to the load 110 is decreasing in comparison with during a constant load).

When the load changes from a constant-load condition to a no-load condition or a light-load condition, in other words, when the load supply current Io (A) decreases, as shown in FIG. 9, the power supply to the load 110 is excessive and the output voltage Vo (B) slightly increases. In response to this, the auxiliary power supply voltage Vcc (C) that is generated by the auxiliary power supply circuit 111 also increases, and the voltage of the error voltage signal VEAO (a) from the error amplifier 122 decreases.

When the voltage of the error voltage signal VEAO (a) decreases, the voltage of the element current detecting signal VCL becomes equivalent to the voltage of the error voltage signal VEAO (a) with a timing that is faster than when at a constant load. As a result, the element current ID (b) flowing through the switching element 105 decreases and the element current detecting signal VCL is also reduced because a control signal for turning off the switching element 105 is output and the ON interval of the switching element 105 is shortened with timing that is faster than when under constant load.

Thus, the switching power supply apparatus adopts a current mode control approach for controlling the current value of the element current ID that flows through the switching element 105, in accordance with the current value of the load supply current Io that is supplied to the load 110.

The element current ID during no load or a light load, and during a heavy load is subsequently described with reference to FIG. 10. FIG. 10 is a diagram that shows the waveform of the element current ID during no load or a light load, and during a heavy load.

During no load or a light load, the energy accumulated in the transformer 104 in the ON interval of the switching element is completely released in the OFF interval. As a result, when the element current ID begins to flow in the subsequent ON interval, the energy in the transformer 104 does not accumulate (non-continuous mode), and the waveform of the element current ID assumes a non-continuous mode waveform (1), as shown in FIG. 10.

During a heavy load, the energy accumulated in the transformer 104 is not completely released in the OFF interval, and when the element current ID begins to flow in the subsequent ON interval, energy remains in the transformer 104 (continuous mode), and the waveform of the element current ID assumes a continuous mode waveform (2), as shown in FIG. 10.

Thus, the generation interval of the capacitive spike current is longer during a heavy load, as shown in FIG. 10, because the element current ID assumes a non-continuous mode waveform (1) during no load or a light load, and a continuous mode waveform (2) during a heavy load. As a result, the blanking interval tBLK must be an interval that is sufficiently long to prevent malfunctioning due to the capacitive spike current even during a heavy load.

Even when the voltage of the element current detecting signal VCL is equal to the voltage of the error voltage signal VEAO and a LOW signal is input to the switching element 105, the element current ID continues to flow until the gate voltage of the switching element 105 reaches a threshold value. The time beginning from when a LOW signal is input to this switching element 105 until the gate voltage of the switching element 105 reaches the threshold value and is turned off is called the element current detecting delay time. With this element current detecting delay time, the element current detecting comparator 124 outputs a HIGH signal because the voltage of the element current detecting signal VCL is greater than the voltage of the error voltage signal VEAO.

The operation from when the switching element is turned on until being turned off is subsequently described with reference to the timing chart in FIG. 11.

The control signal from the gate driver 128 becomes the HIGH signal for turning on the switching element 105, and when the gate voltage (d) of the switching element 105 increases and reaches a threshold value VT, the switching element 105 is turned on and the element current ID (b) begins to flow. A capacitive spike current is produced the instant this element current ID (b) begins to flow.

The on-blanking pulse generating circuit 131 generates a blanking signal (e) that is a LOW signal after the switching element 105 is turned on in the fixed interval (blanking interval tBLK) determined by the capacitance of the blanking interval generating capacitor 140, the threshold value set in the inverter 141, and the current value of the constant current source 144; and is a HIGH signal after the blanking interval tBLK has elapsed.

Thus, even when the comparison signal (f) from the element current detecting comparator is a HIGH signal and the voltage of the error voltage signal (a) is equal to the voltage of the element current detecting signal VCL (c) due to the capacitance spike current, the output signal (g) of the AND circuit 130 remains a LOW signal because the blanking pulse signal (e) from the on-blanking generating circuit 131 is a LOW signal.

After the blanking interval tBLK has elapsed and the blanking pulse signal (e) from the on-blanking generating circuit 131 becomes a HIGH signal, the output signal (g) of the AND circuit 130 becomes a HIGH signal and the gate driver 128 outputs a LOW signal when the voltage of the element current detecting signal VCL (c) is equal to the voltage of the error voltage signal VEAO (a) and the comparison signal (f) from the element detecting comparator is a HIGH signal.

Even when a LOW signal is input to the switching element 105, as described above, the switching element 105 does not turn off until the gate voltage (d) of the switching element 105 reaches the threshold value voltage VT, and the element current ID continues to flow.

In the switching power supply apparatus described above, oscillation of the switching element is prevented from being halted due to a capacitive spike current with the aid of a blanking signal that is generated by the on-blanking pulse generating circuit.

However, in the switching power supply apparatus, the blanking interval is fixed, so there is a possibility that the drawbacks described below may occur.

FIG. 12 is a timing chart that describes the operation that begins when the switching element is turned on during no load or a light load until the system is turned off.

The blanking interval tBLK is set to an interval that is sufficient to allow malfunctioning due to a capacitive spike current to be prevented even during a heavy load, as described above. However, during no load or a light load, a blanking interval tBLK that has been set for times of heavy loads may be too long, and there is possibility that an element current will flow that is equal to or greater than the current value that should flow to the switching element.

In other words, the time from the moment the control signal (HIGH signal) for turning on the switching element is output until the moment the voltage of the error voltage signal VEAO (a) and the voltage of the element current detecting signal VCL (c) become equal to each other is sometimes shorter than the blanking interval tBLK during no load or a light load, as shown in FIG. 12.

In such a case, even when voltages of the error voltage signal VEAO (a) and the element current detecting signal VCL (c) are equal and the comparison signal (f) from the element current detecting comparator 124 is a HIGH signal, the output signal (g) of the AND circuit is a LOW signal and the element current ID (b) continues to flow because the blanking pulse signal (c) from the on-blanking pulse generating circuit is a LOW signal until the blanking interval tBLK has elapsed.

Even when the on-blanking pulse generating circuit outputs a HIGH signal, the element current ID (b) continues to flow during the element current detecting delay time, as described above.

In other words, in a range in which there is no load, a light load, or another condition corresponding to a low current value for the element current ID, the element current value is determined by the minimum pulse interval comprising the blanking internal and the element current detecting delay time, and the value thereof becomes larger than the value that should be controlled by feedback to the output. This results in a drawback whereby more energy than is required is transmitted to the secondary side (output side) of the transformer, and the output voltage Vo becomes equal to or exceeds the prescribed voltage.

When a blanking interval is set in conjunction with times of no load or a light load to resolve the above-stated drawbacks, drawbacks such as those shown in FIG. 13 occur.

In other words, when a blanking interval is set in conjunction with times of no load or a light load, the output signal (g) of the AND circuit 130 becomes a HIGH signal when the voltages of the element current detecting signal VCL (c) and the error voltage signal VEAO (a) become equal to each other due to a capacitive spike current during a heavy load. As a result, a drawback occurs whereby the element current ID (b) flows only for a very short interval, the required energy with respect to the load is not transmitted to the secondary side of the transformer, and the output voltage Vo becomes equal to or less than the prescribed voltage.

As described above, the switching power supply apparatus adopts a current mode control approach in which the element current ID that flows to the switching element during standby or under other conditions of no load or a light load decreases, and, conversely, the element current ID that flows to the switching element during a heavy load increases.

However, with the switching power supply apparatus, the blanking interval tBLK is fixed irrespective of whether the conditions correspond to no load, a light load, or a heavy load.

As a result, when an interval is set that is sufficient to prevent malfunction due to capacitive spike current even during a heavy load, the element current is controlled by the minimum pulse interval during no load or a light load, maximum energy is transmitted to the secondary side, and the output voltage increases excessively.

Conversely, when the blanking interval tBLK is set in accordance with no load or a light load, then a malfunction occurs whereby the switching element is turned off by the capacitive spike current during a heavy load, the interval in which the element current flows is short, the energy required for the load is not transmitted to the secondary side, and the prescribed output voltage cannot be obtained.

In view of the above, a switching power supply apparatus has been proposed in prior art (refer to Japanese Laid-Open Patent Application 2002-112538) that solves the above-stated drawbacks by setting the blanking interval tBLK to an interval that is sufficient to prevent a malfunction due to a capacitive spike current even during a heavy load, and adding dummy resistance. Nevertheless, adding a dummy resistance is disadvantageous in that the power supply efficiency is reduced or the like.

SUMMARY OF THE INVENTION

An object of the present invention is to provide a switching power supply apparatus in which the blanking interval can be changed in accordance with load conditions such as those existing during no load, a light load, or a heavy load, and that is capable of normal element current control for an entire range of loads.

In order to achieve this object, the switching power supply apparatus according to the first aspect of the present invention comprises a switching element, a control circuit for controlling the switching operation of the switching element, a transformer for converting an inputted first DC voltage into AC electric power by means of the switching operation of the switching element and outputting the AC electric power, an output voltage generating circuit for generating a second DC voltage from the AC electric power and outputting the voltage to an external load, and a power supply circuit for generating a DC voltage in accordance with the second DC voltage and setting the generated DC voltage as a power supply voltage of the control circuit, the control circuit comprising:

an oscillator for generating a switching signal that induces a switching operation in the switching element, an element current detecting circuit for detecting element current that flows through the switching element and outputting the current as an element current detecting signal, an error amplifier for generating and outputting an error voltage signal as a voltage value that corresponds to the difference between a reference voltage and the power supply voltage, an element current detecting comparator for comparing the voltage value of the error voltage signal and that of the element current detecting signal, and outputting a comparison signal that corresponds to the comparison result thereof, a switching signal control circuit for controlling the switching signal so that the second DC voltage is brought to a prescribed voltage on the basis of the comparison signal from the element current detecting comparator, and outputting this as a control signal to the switching element, and an on-blanking pulse generating circuit for generating a blanking pulse signal that disables, based on the voltage value of the error voltage signal, the comparison signal from the element current detecting comparator in the period that corresponds to the load condition from the instant when the switching element is turned on, and ensuring that the switching element is not turned off during this period.

A switching power supply apparatus according to the second aspect of the present invention is the switching power supply apparatus according to the first aspect, wherein the on-blanking pulse generating circuit comprises:

a blanking interval generating capacitor, a blanking pulse signal generating circuit for generating the blanking pulse signal that disables the comparison signal from the element current detecting comparator until the electric potential of the blanking interval generating capacitor reaches a threshold value, a mirror circuit that is connected to a constant current source and is capable of varying the outflow rate of the current from the blanking interval generating capacitor in two steps, a first switch element for connecting the mirror circuit and the blanking interval generating capacitor and allowing current to flow from the blanking interval generating capacitor when a control signal for turning on the switching element is received from the switching signal control circuit, a load-detecting circuit for comparing the voltage value of the error voltage signal and the reference voltage, and outputting a comparison signal that corresponds to the comparison result thereof, and a second switch element for varying the outflow rate of the current from the blanking interval generating capacitor in two steps in accordance with the comparison signal from the load-detecting device.

A switching power supply apparatus according to the third aspect of the present invention is the switching power supply apparatus according to the first aspect, wherein the on-blanking pulse generating circuit comprises:

a blanking interval generating capacitor capable of varying the capacitance value in two steps, a blanking pulse signal generating circuit for generating the blanking pulse signal that disables the comparison signal from the element current detecting comparator until the electric potential of the blanking interval generating capacitor reaches a threshold value, a mirror circuit for connecting to a constant current source, a first switch element for connecting the mirror circuit and the blanking interval generating capacitor and allowing current to flow from the blanking interval generating capacitor when a control signal for turning on the switching element is received from the switching signal control circuit, a load-detecting circuit for comparing the voltage value of the error voltage signal and the reference voltage, and outputting a comparison signal that corresponds to the comparison result thereof, and a third switch element for varying the capacitance value of the current from the blanking interval generating capacitor in two steps in accordance with the comparison signal from the load-detecting device.

A switching power supply apparatus according to the fourth aspect of the present invention is the switching power supply apparatus according to the second aspect, wherein the reference voltage of the load-detecting circuit is set to the voltage value of the error voltage signal generated when the element current value is controlled by the minimum pulse interval.

A switching power supply apparatus according to the fifth aspect of the present invention is the switching power supply apparatus according to the third aspect, wherein the reference voltage of the load-detecting circuit is set to the voltage value of the error voltage signal generated when the element current value is controlled by the minimum pulse interval.

A switching power supply apparatus according to the sisth aspect of the present invention is the switching power supply apparatus according to the first aspect, wherein the on-blanking pulse generating circuit comprises:

a blanking interval generating capacitor, a mirror circuit for connecting to a constant current source, a first switch element for connecting the mirror circuit and the blanking interval generating capacitor and allowing current to flow from the blanking interval generating capacitor when a control signal for turning on the switching element is received from the switching signal control circuit, and a blanking interval adjusting circuit for linearly varying the current value flowing to the mirror circuit from the constant current source in accordance with the voltage value of the error voltage signal, and linearly adjusting the outflow rate of the current from the blanking interval generating capacitor.

A switching power supply apparatus according to the seventh aspect of the present invention is the switching power supply apparatus according to any of the first to sixth aspects, wherein the switching element and the control circuit are integrated and formed on a single semiconductor substrate, with the output and input terminals of the switching element and the input terminal of the control circuit to which a feedback signal is input serving as external connection terminals.

BRIEF DESCRIPTION OF THE DRAWINGS

FIG. 13 is a timing chart (during a heavy load) that describes the operation beginning when the switching element is turned on until it is turned off in a conventional switching power supply apparatus.

DESCRIPTION OF THE PREFERRED EMBODIMENTS

An embodiment of the present invention is described below with reference to the diagrams. The embodiment described herein is no more than an example, and the present invention is not limited to this embodiment.

Figure 1:
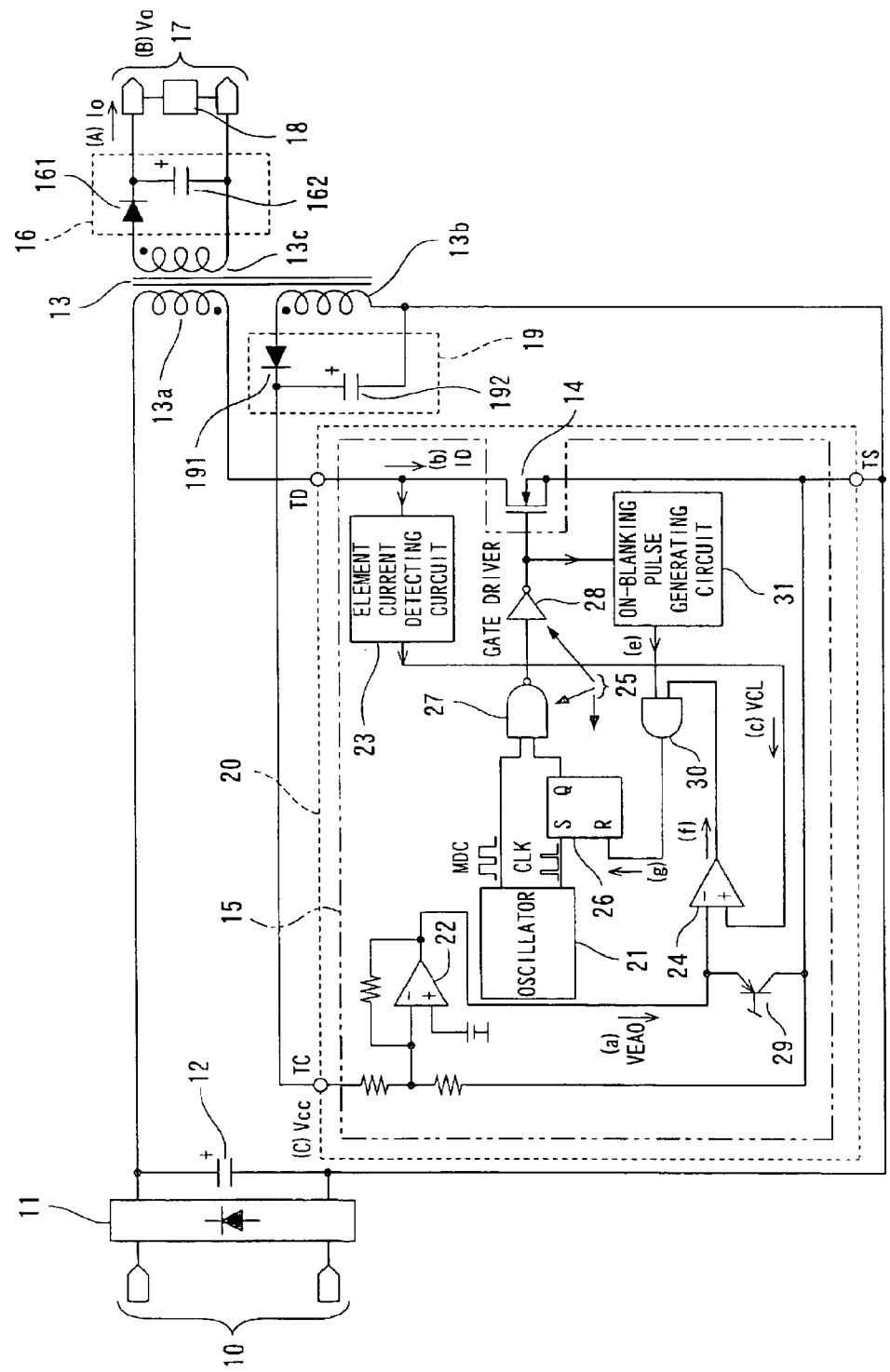
FIG. 1 is a circuit diagram showing an outline of the switching power supply apparatus related to an embodiment of the present invention.

FIG. 1 is a circuit diagram showing an outline of an insulated-type switching power supply apparatus, in which the input and output sides are insulated, related to an embodiment of the present invention.

As shown in FIG. 1, the switching power supply apparatus rectifies and smoothes the AC electric power that is applied to a main input terminal 10 from, for example, a commercial power supply or the like, and forms DC voltage Vin, which is a first DC voltage. The switching power supply apparatus performs switching action by means of a switching element 14 while applying this DC voltage Vin to the winding on the primary side (first primary winding 13a; hereinafter simply referred to as primary winding 13a) of the a transformer (converter) 13 for converting electric power to produce electromotive force by way of magnetic induction in the winding on the secondary side (secondary winding 13c). The switching power supply apparatus rectifies and smoothes AC electric power created by this electromotive force by way of an output voltage generating circuit 16 disposed on the secondary side of the transformer 13, drops the voltage to the output voltage Vo, which is the second DC voltage, and outputs the voltage to the main output terminal 17.

The switching power supply apparatus is described in detail below.

A rectifier 11 comprising a diode bridge and other components for rectifying AC electric power, and an input capacitor 12 for smoothing this rectified signal and generating the DC voltage Vin are connected in parallel to the main input terminal 10.

The generated DC voltage Vin is input to the primary winding 13a of the transformer 13, and is thereafter input to the drain terminal TD of a switching element 14 comprising an N-type power MOSFET, for example. Here, the source terminal TS of the switching element 14 is connected with the terminal on the low-level side of the main input terminal 10. A control signal that is output from a control circuit 15 for controlling the switching action of the switching element 14 is input to the gate terminal of the switching element 14.

An output voltage generating circuit 16 is connected to the secondary winding 13c of the transformer 13. The output voltage generating circuit 16 comprises a first diode 161 for rectifying AC electric power created by the electromotive force produced in the secondary winding 13c by means of the switching action of the switching element 14, and a first output capacitor 162 for smoothing this rectified signal. The output voltage generating circuit 16 may take a configuration in which the AC electric power is rectified and smoothed, but is not limited to this.

A load 18 is connected to the main output terminal 17, itself connected to the output voltage generating circuit 16, between the terminal on the low-level side and the terminal on the high-level side thereof, and the load supply current Io from the output voltage Vo generated by the output voltage generating circuit 16 flows to the load 18.

A second primary winding (auxiliary winding) 13b is disposed on the primary side of the transformer 13. An electromotive force created by magnetic induction through the switching operation of the switching element 14 is produced in the auxiliary winding 13b in the same manner as the secondary winding 13c.

An auxiliary power supply circuit (power supply circuit) 19 for generating the auxiliary power supply voltage (power supply voltage) Vcc of the control circuit 15 is connected to the auxiliary winding 13b. The auxiliary power supply circuit 19 comprises a second diode 191 for rectifying AC electric power created by the electromotive force produced in the auxiliary winding 13b, and a second output capacitor 192 for smoothing this rectified signal, and generates an auxiliary power supply voltage Vcc.

The auxiliary winding 13b is disposed so that the auxiliary power supply voltage Vcc and the output voltage Vo are proportional. The auxiliary power supply voltage Vcc generated by the auxiliary power supply circuit 19 is input to the control terminal TC of the control circuit 15. The auxiliary power supply circuit 19 may take a configuration in which the AC electric power is rectified and smoothed, but is not limited to this.

The control circuit 15 uses this auxiliary power supply voltage Vcc as a drive signal, and also uses this voltage as a feedback signal for stabilizing the output voltage Vo because the auxiliary power supply voltage Vcc and the output voltage Vo are proportional to the winding ratio of the auxiliary winding 13b and the secondary winding 13c. In other words, the control circuit 15 controls the switching action of the switching element 14 on the basis of the auxiliary power supply voltage Vcc so that the output voltage Vo remains stable at a prescribed voltage.

In FIG. 1, the area defined by the dotted line 20, in other words, the area that contains the switching element 14 and the control circuit 15 and can be connected to the outside by at least three terminals, namely, a drain terminal TD (input terminal) and a source terminal TS (output terminal) of the switching element 14, and the control terminal TC (input terminal for a feedback signal) of the control circuit 15, is referred to as the formation area on the substrate. The term "formation area 20 on the substrate" indicates that it is possible to integrate the elements within this area onto a single semiconductor substrate, and to form a semiconductor chip (semiconductor device).

In lieu of forming the formation area 20 on the substrate as a single semiconductor chip, the area may be divided and formed into a plurality of semiconductor chips. However, even when dividing the area into a plurality of semiconductor chips, the assembly is preferably housed in a single package that is capable of connecting externally by way of at least the three terminals, namely, the drain terminal TD, the source terminal TS, and the control terminal TC.

The control circuit 15 is described below.

An oscillator 21 first generates a switching signal that induces a switching action (a repeating ON/OFF action) in the switching element 14. In other words, the oscillator 21 generates and outputs a signal CLK (generation frequency: about 100 kHz) for determining the switching frequency of the switching element 14, and a maximum duty cycle signal MDC for determining the maximum duty cycle of the switching element 14.

An error amplifier 22 further generates and outputs an error voltage signal VEAO that is the voltage value that corresponds to the difference between the auxiliary power supply voltage Vcc and the reference voltage. More specifically, the error amplifier 22 receives to the opposite-phase input terminal the auxiliary power supply voltage Vcc that is input to the control terminal TC and resistively divided, generates the error voltage signal VEAO that comprises the difference between this voltage and a prescribed reference voltage that is set in advance and is received at the normal-phase input terminal, and outputs the result to an element current detecting comparator 24. Here, the opposite-phase input terminal of the error amplifier 22 is also connected to the source terminal TS of the switching element 14 through resistance. The voltage of the error voltage signal VEAO decreases as the auxiliary power supply voltage Vcc increases, and increases as the auxiliary power supply voltage Vcc decreases.

The element current detecting circuit 23 detects the element current ID that flows from the primary winding 13a of the transformer 13 to the switching element 14, converts the result into a voltage signal that corresponds to the current value thereof, and outputs the result to the element current detecting comparator 24 as an element current detecting signal VCL.

The element current detecting comparator 24 compares the voltage of the element current detecting signal VCL and the error voltage signal VEAO, the amount of current that flows into the switching element 14 is adjusted, and the output voltage Vo is stabilized at a prescribed voltage by generating and outputting a comparison signal that turns off the switching element 14 on the basis of this comparison result. More specifically, the element current detecting comparator 24 outputs a HIGH signal to the one of the input terminals of the AND circuit 30 when the switching element 14 is turned on and the voltage of the element current detecting signal VCL increases and becomes equivalent to the voltage of the error voltage signal VEAO. The switching element 14 is turned off when this HIGH signal is input to the RESET terminal of an RS flip-flop circuit 26 that is described below.

The switching signal control circuit 25 comprises the RS flip-flop circuit 26, a NAND circuit 27, and a gate driver 28. The RS flip-flop circuit 26 receives a clock signal CLK that is output from the oscillator 21 to the SET terminal, and receives a signal that is output from the AND circuit 30 to the RESET terminal. The NAND circuit 27 receives a maximum duty cycle signal MDC that is output from the oscillator 21 to one of the input terminals, and receives a signal that is output from the RS flip-flop circuit 26 to the other input terminal. The gate driver 28 receives a signal that is output from the NAND circuit 27, inverts and amplifies this signal, and outputs a control signal to the switching element 14.

The switching element control circuit 25 controls the ON interval of the switching element 14 by controlling the switching signal on the basis of the comparison signal (the output signal from the AND circuit 30 (*1)) from the element current detecting comparator 24. In other words, the switching signal control circuit 25 controls the switching signal so that the switching element 14 is turned off when the voltage of the error voltage signal VEAO and the voltage of the element current detecting signal VCL are equal and the comparison signal from the element current detecting comparator 24 is a HIGH signal.

Thus, the control circuit 15, with the auxiliary power supply voltage Vcc that is proportional to the output voltage Vo supplied to the load 18 serving as the feedback signal, controls the element current ID that flows from the primary winding 13a of the transformer 13 to the switching element 14 by controlling the ON interval (the OFF interval) of the switching element 14, and ensures that the output voltage Vo remains stable at a prescribed voltage.

An excess current protecting circuit 29 comprising a PNP-type bipolar transistor that clamps the maximum voltage value of the error voltage signal VEAO is provided to the output side of the error amplifier 22. By clamping the maximum voltage value of the error voltage signal VEAO in this manner, the control circuit 15 clamps the maximum value of the element current ID that flows to the switching element 14, and prevents excess current from flowing to the switching element 14.

The control circuit 15 is connected between the drain terminal TD of the switching element 14 and the control terminal TC of the control circuit 15.

There is no limit to the voltage value of the DC voltage Vin and the output voltage Vo in the switching power supply apparatus.

An N-type power MOSFET is used in the switching element 14, but an NPN-type bipolar transistor may be used instead.

An on-blanking pulse generating circuit 31 that is connected to the other of the input terminal of the AND circuit 30 is subsequently described.

The on-blanking pulse generating circuit 31 outputs a blanking pulse signal that disables the comparison signal from the element current detecting comparator 24 for an interval of time (blanking interval) that corresponds to the load condition after the switching circuit 14 has been turned on. The on-blanking pulse generating circuit 31 ensures that the switching element 14 is not turned off by this blanking pulse signal under an entire range of loads due to a capacitive spike current. More specifically, the on-blanking pulse generating circuit 31 outputs a blanking signal that is a LOW signal to the AND circuit 30 during the blanking interval, and a blanking signal that is a HIGH signal after the blanking interval has elapsed.

Figure 8:
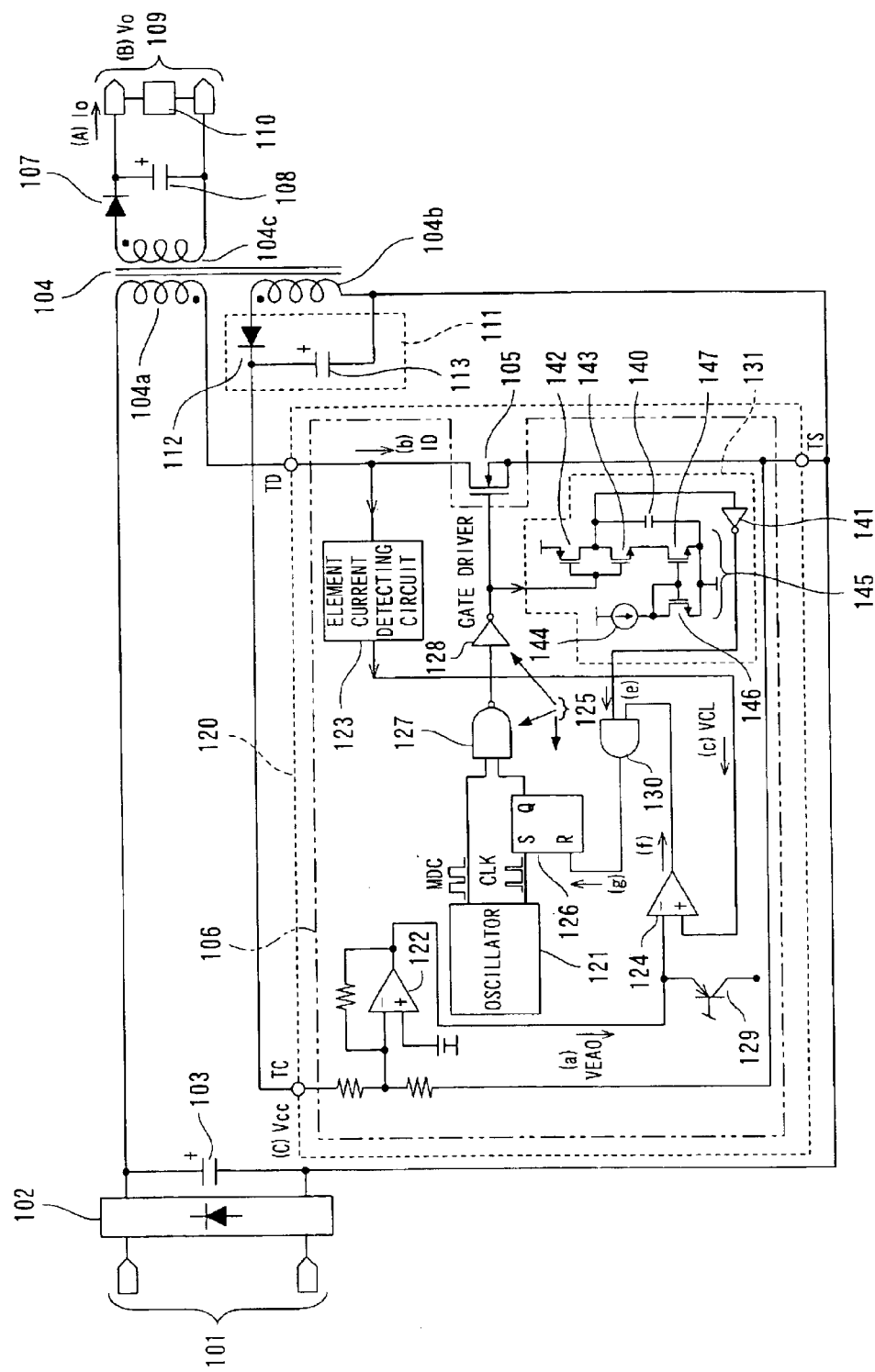
FIG. 8 is a circuit diagram showing an outline of a conventional switching power supply apparatus.
Figure 9:
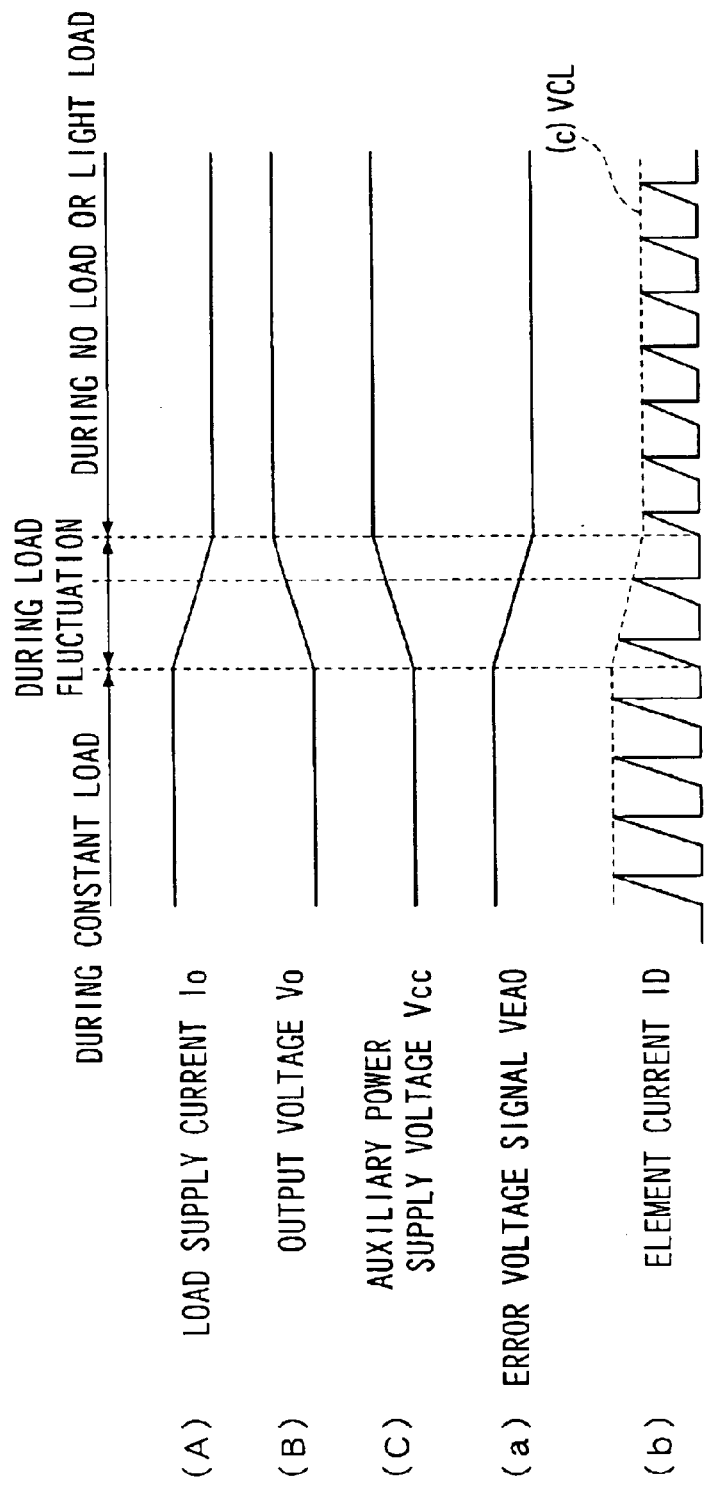
FIG. 9 is a timing chart that describes the operation during load fluctuations of a conventional switching power supply apparatus.
Figure 10:
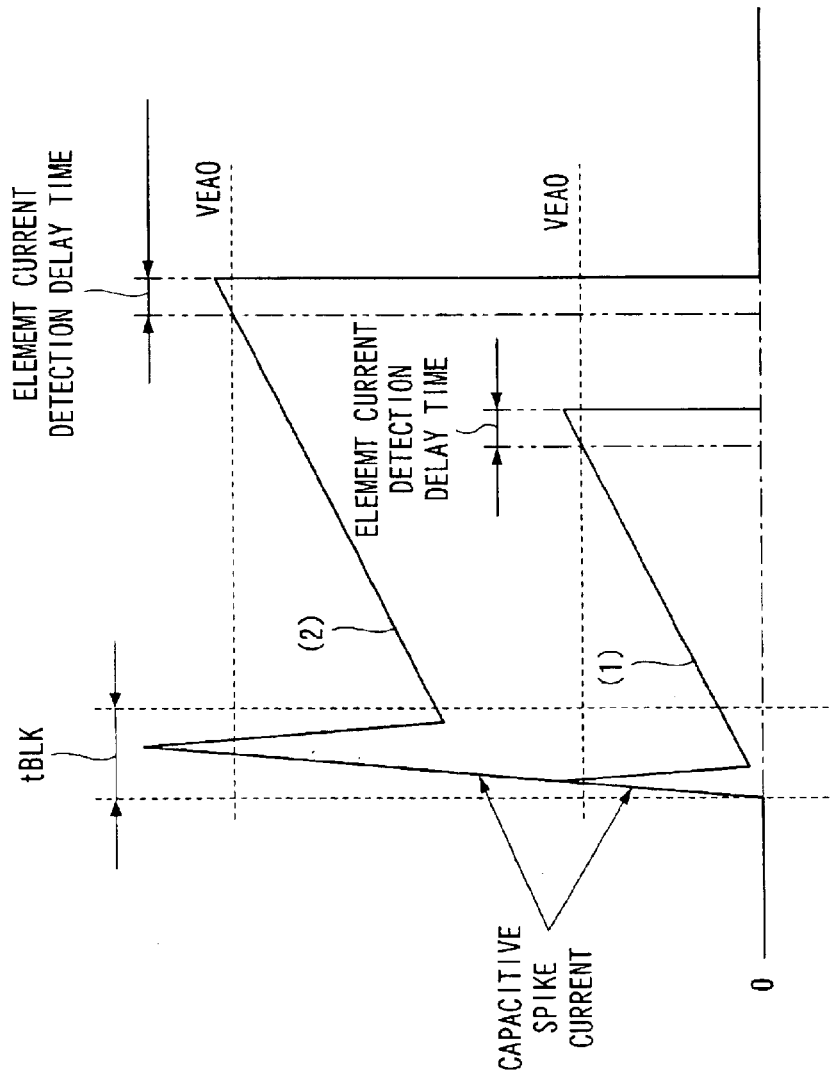
FIG. 10 is a diagram showing the waveform of the element current that flows to the switching element.
Figure 11:
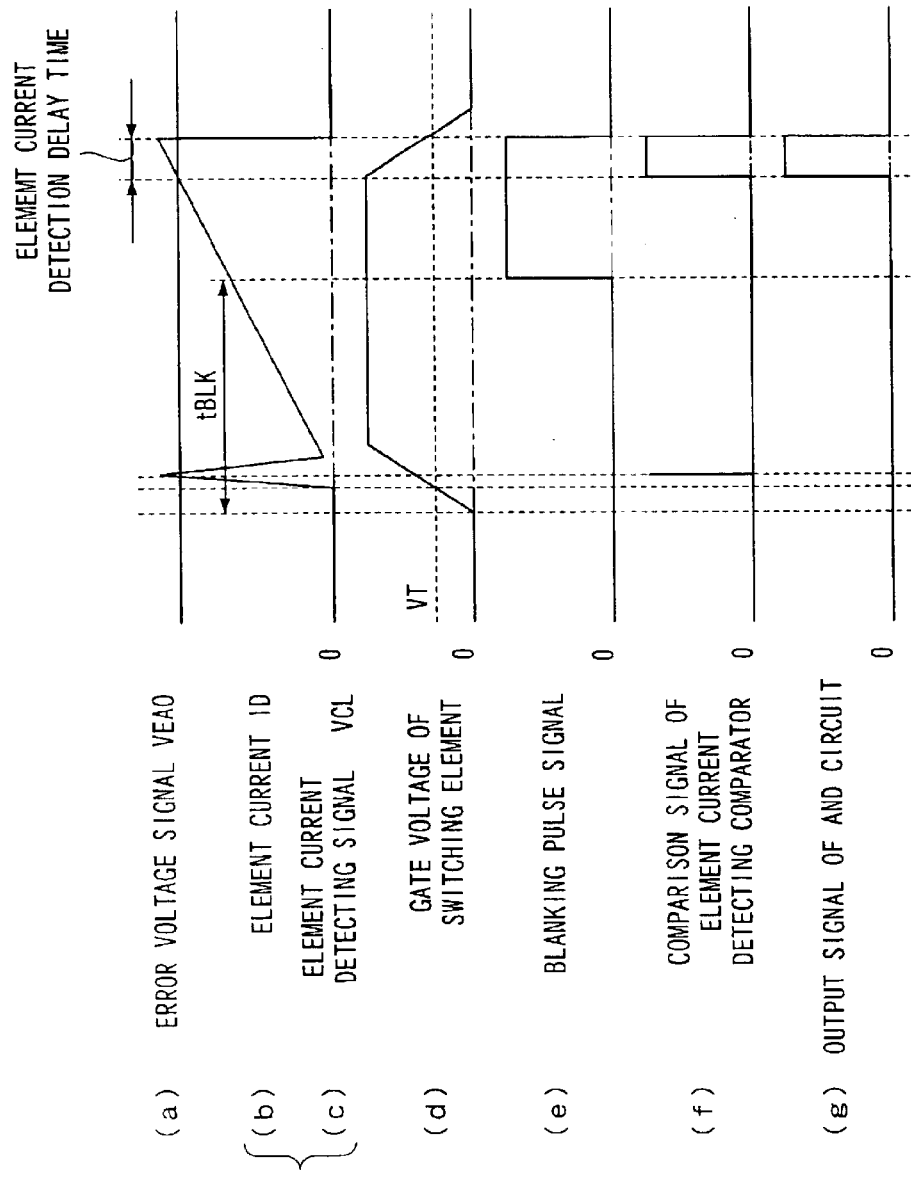
FIG. 11 is a timing chart (during a constant load) that describes the operation beginning when the switching element is turned on until it is turned off in a conventional switching power supply apparatus.

The on-blanking pulse generating circuit of the switching power supply apparatus generates a blanking pulse signal on the basis of the error voltage signal VEAO, and the point in which the blanking interval varies in accordance with the load condition is different from the conventional switching power supply apparatus shown in FIG. 8. In other words, the blanking interval in the switching power supply apparatus is not a fixed interval, but varies in accordance with the load condition.

The first structural example of the on-blanking pulse generating circuit related to the present embodiment is described below with reference to FIG. 2.

Figure 2:
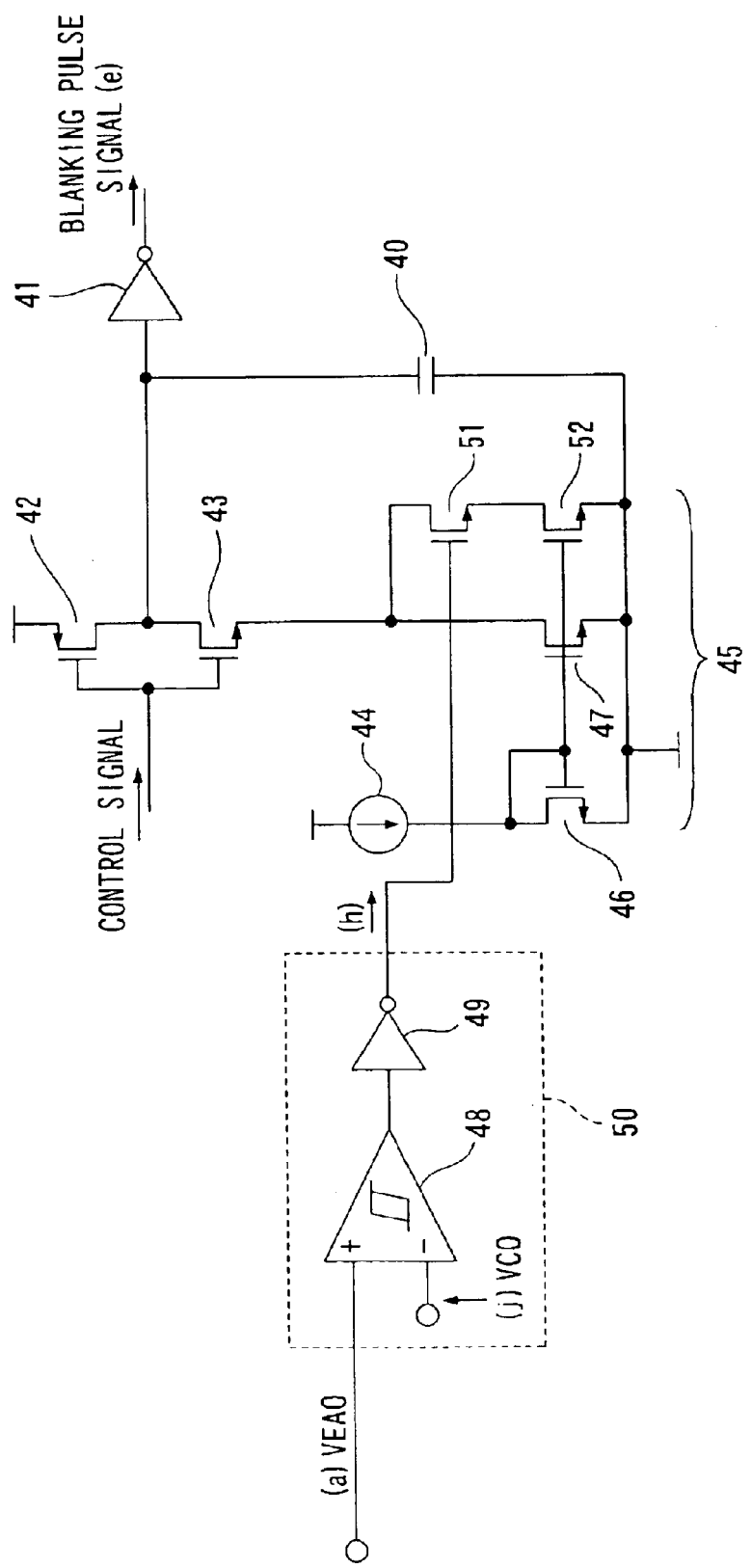
FIG. 2 is a circuit diagram showing an outline of a first structural example of the on-blanking pulse generating pulse circuit in the switching power supply apparatus related to an embodiment of the present invention.

A blanking interval generating capacitor 40 is connected between the ground of the control circuit 15 and the input terminal of an inverter 41, as shown in FIG. 2. The inverter 41 outputs a blanking pulse signal that is a LOW signal while the electric potential of the blanking interval generating capacitor 40 is higher than a threshold value voltage, and a HIGH signal when the threshold value voltage is reached.

In other words, the on-blanking pulse generating circuit 31 disables the comparison signal from the element current detecting comparator 24 in the interval that begins when the control signal for turning on the switching element 14 is output from the gate driver 28 until the electric potential of the blanking interval generating capacitor 40 reaches the threshold value voltage of the inverter 41. This interval is the blanking interval.

A P-type transistor 42 and an N-type transistor 43 form an inverting circuit wherein the drain terminals are connected together, a control signal from the gate driver 28 is input to the gate terminals; and the opening and closing thereof are inverted in accordance with this control signal. In other words, when a control signal (HIGH signal) for turning on the switching element 14 is received from the gate driver 28, the P-type transistor 42 is turned off and the N-type transistor (first switch element) 43 is turned on. Conversely, when a control signal (LOW signal) that turns off the switching element 14 is received from the gate driver 28, the P-type transistor 42 is turned on and the N-type transistor 43 is turned off.

The blanking interval generating capacitor 40 is connected to the connecting portion (between the drain terminals) of the P-type transistor 42 and an N-type transistor 43.

A mirror circuit 45 comprises N-type transistors 46, 47, and 52. A constant current source 44 is a constant current source for lowering the electric potential of the blanking interval generating capacitor 40. The constant current source 44 is connected to the N-type transistor 46. The source terminal of the N-type transistor 43 is connected to the N-type transistor 47. The source terminal of the N-type transistor 43 is connected to the N-type transistor 52 by way of a switching transistor (second switch element) 51.

A load detecting circuit 50 comprises a load detecting comparator 48 for receiving the error voltage signal VEAO from the error amplifier 22 to the normal-phase input terminal, and receiving a reference voltage VCO (VCO1 and 2) having a hysteresis to the opposite-phase input terminal, and also comprises an inverter 49 for inverting and outputting this voltage. The switching transistor 51 opens and closes in accordance with the output signal of this load detecting circuit 50 (inverter 49). In other words, the load detecting circuit 50 controls the connection between source terminal of the N-type transistor 43 and the N-type transistor 52 by controlling the switching transistor 51 on the basis on the voltage value of the error voltage signal VEAO.

With a configuration such as that described above, current flows from the blanking interval generating capacitor 40 such that current that is proportional to the current that flows from the constant current source 44 flows to the N-type transistor 47 and the N-type transistor 52 when both the N-type transistor 43 and the switching transistor 51 are on in the on-blanking pulse generating circuit. Conversely, when the N-type transistor 43 is on and the switching transistor 51 is off, current flows from the blanking interval generating capacitor 40 such that current that is proportional to the current that flows from the constant current source 44 flows to the N-type transistor 47.

Thus, in the on-blanking pulse generating circuit, by controlling the opening and closing of the switching transistor 51 on the basis of the error voltage signal VEAO, it is possible to achieve a two-step variation for the current outflow rate of the blanking interval generating capacitor 40, in other words, the decrease rate of the electric potential of the blanking interval generating capacitor 40, and, as a result, the blanking interval varies in two steps.

The operation of the on-blanking pulse generating circuit is described below.

The load detecting comparator 48 compares the reference voltage VCO that has a hysteresis and the voltage of the error voltage signal VEAO to be input, outputs a LOW signal when the voltage of the error voltage signal VEAO is lower than the reference voltage VCO, and outputs a HIGH signal when higher. In other words, the load detecting circuit 50 compares the reference voltage and the voltage of the error voltage signal VEAO, outputs a HIGH signal when the voltage of the error voltage signal VEAO is lower than the reference voltage VCO, and turns the switching transistor 51 on. Conversely, when the voltage of the error voltage signal VEAO is higher than the reference voltage VCO, the load detecting circuit 50 turns the switching transistor 51 off.

In view of the above, the reference voltage VCO is set so that the switching transistor 51 is turned on during no load or a light load, and is turned off during a constant load or a heavy load. In other words, the amount of current that flows out from the blanking interval generating capacitor 40 is increased so that the blanking interval is shorter during no load or a light load, and the amount of current that flows out is decreased so that the blanking interval is extended.

When the switching element 14 is turned on, a HIGH signal is output from the gate driver 28, the P-type transistor 42 is turned off, and the N-type transistor 43 is turned on.

As long as the condition is a constant load or a heavy load (the switching transistor 51 is in an OFF condition), current that is proportional to the current through the constant current source 44 flows from the blanking interval generating capacitor 40 to the N-type transistor 47, and the electric potential of the blanking interval generating capacitor 40 decreases due to the mirror effect.

As long as the condition is no load or a light load (the switching transistor 51 is in an ON condition), current flows from the blanking interval generating capacitor 40 so that current that is proportional to the current through the constant current source 44 flows to the N-type transistor 47 and the N-type transistor 52.

As a result, during no load or a light load, the amount of current that flows from the blanking interval generating capacitor 40 increases more than during a constant load or a heavy load, so the decrease rate the electric potential of the blanking interval generating capacitor 40 also increases. The time until reaching the threshold value voltage of the inverter 41 is therefore shorter than during a constant load or a heavy load, and, as a result, the blanking interval is also shorter.

Thus, the amount of current required to reduce the electric potential of the blanking interval generating capacitor 40 varies in two steps in accordance with the load condition, so the blanking interval also varies in two steps.

When the electric potential of the blanking interval generating capacitor 40 reaches the threshold value voltage of the inverter 41, a HIGH signal is output from the inverter 41.

When the switching element 14 is turned off (when a LOW signal is output from the gate driver 28), the P-type transistor 42 is turned on, the N-type transistor 43 is turned off, current flows into the blanking interval generating capacitor 40, and the electric potential thereof increases. When the electric potential of the blanking interval generating capacitor 40 then reaches the threshold value voltage of the inverter 41, a LOW signal is output from the inverter 41.

Figure 3:
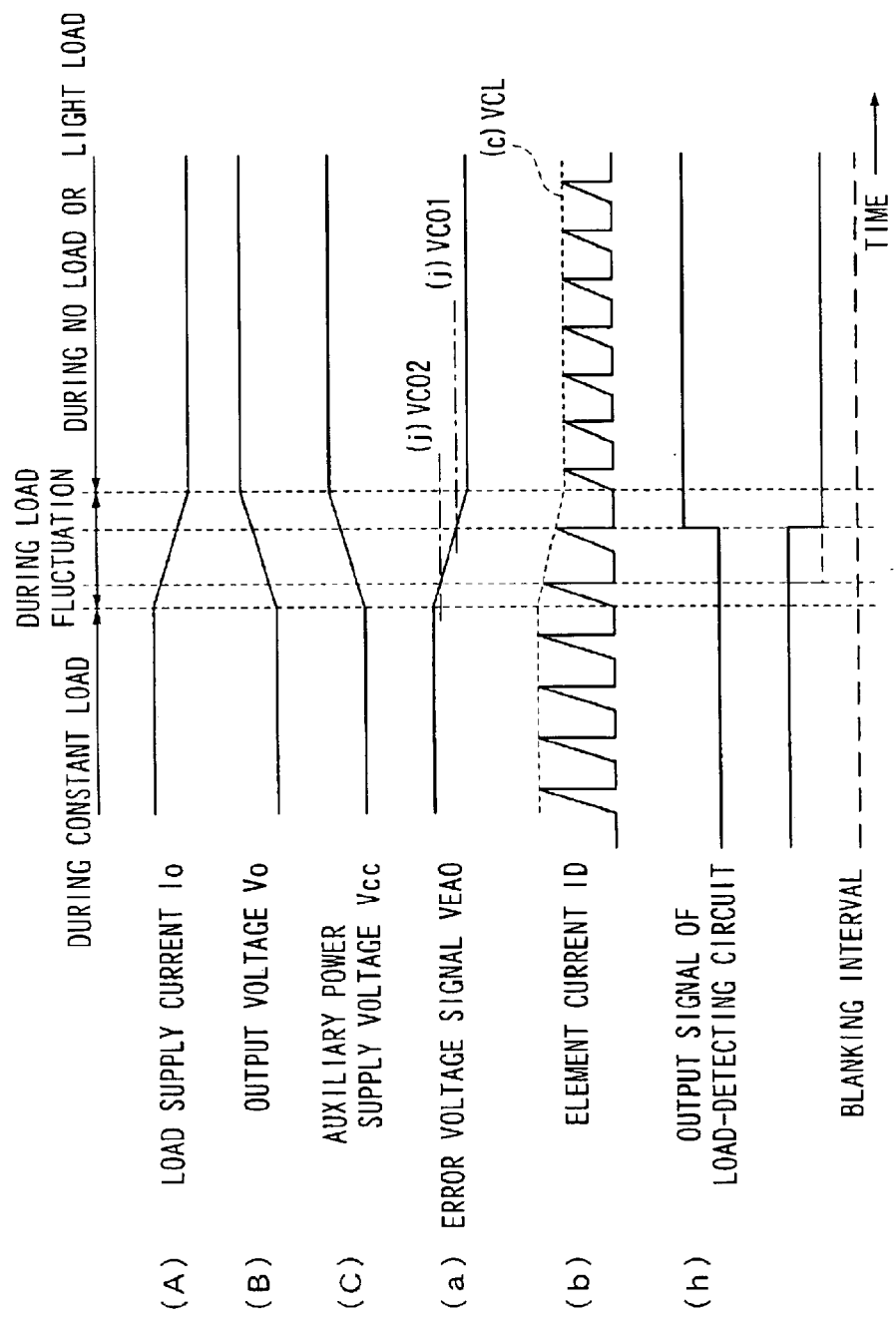
FIG. 3 is a first timing chart that describes the operation during load fluctuations of the switching power supply apparatus related to an embodiment of the present invention.

Operation during a load change in the switching power supply device is subsequently described with reference to the timing chart shown in FIG. 3. FIG. 3 is a timing chart of when the load changes from a constant-load condition toward a no-load condition or a light-load condition (condition in which the amount of current that flows from the output voltage generating circuit 16 to the load 18 is decreasing in comparison with during a constant load).

When the load changes from a constant-load condition toward a no-load condition or a light-load condition, in other words, when the load supply current Io (A) decreases, as shown in FIG. 3, the power supply to the load 18 is excessive and the output voltage Vo (B) slightly increases. In response to this, the auxiliary power supply voltage Vcc (C) that is generated by the auxiliary power supply circuit 19 also increases, and the voltage of the error voltage signal VEAO (a) output from the error amplifier 22 decreases in the control circuit 15 because the voltage that is applied to the opposite-phase input terminal of the error amplifier 22 decreases.

When the voltage of the error voltage signal VEAO (a) decreases, the voltage of the element current detecting signal VCL (c) becomes equivalent to the voltage of the error voltage signal VEAO (a) with a timing that is faster than when at a constant load. As a result, the element current ID (b) flowing through the switching element 14 decreases and the element current detecting signal VCL (c) is also reduced because a control signal that turns off the switching element 14 is output with timing that is faster than when at a constant load, and the ON interval of the switching element 14 is shortened.

Figure 12:
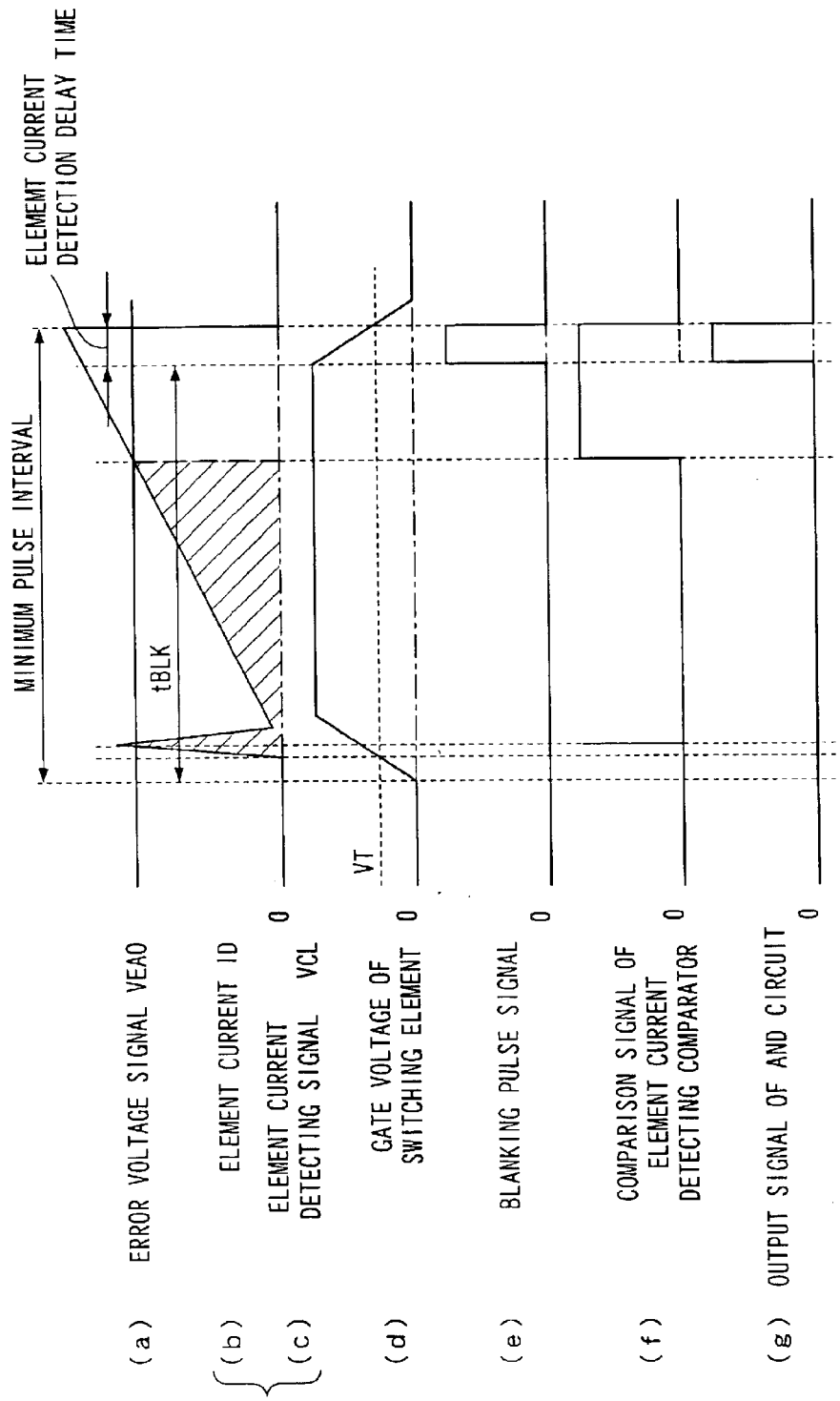
FIG. 12 is a timing chart (during no load or a light load) that describes the operation beginning when the switching element is turned on until it is turned off in a conventional switching power supply apparatus.

When the voltage of the error voltage signal VEAO (a) decreases and becomes less than the reference voltage VCO1 applied to the load detecting comparator 48, the output signal (h) of the load detecting circuit 50 becomes a HIGH signal, the switching transistor 51 is turned on, and the amount of current for lowering the electric potential of the blanking interval generating capacitor 40 increases in comparison with when at a constant load or a heavy load, so the blanking interval is shortened in comparison with when at a constant load or a heavy load. As a result, the element current ID is not controlled (refer to FIG. 12) by the minimum pulse interval during no load or a light load, and the output voltage Vo can be stabilized at a prescribed voltage because the element current ID can be controlled on the basis of the feedback signal (auxiliary power supply voltage VCC).

Hysteresis characteristics are provided to the reference voltage VCO so that the blanking interval does not immediately change, even if the voltage of the error voltage signal VEAO does change. In other words, when the voltage of the error voltage signal VEAO (a) is less than the reference voltage VCO1, the reference voltage becomes VCO2. Conversely, when the voltage of the error voltage signal VEAO (a) is greater than the reference voltage VCO2, the reference voltage becomes VCO1.

On the other hand, when the load condition changes from a constant-load condition to a no-load condition or a light-load condition, the voltage of the error voltage signal VEAO (a) increases. When the voltage of the error voltage signal VEAO (a) becomes greater than the reference voltage VCO2 applied to the load detecting comparator 48, the switching transistor 51 is turned off, and the amount of current for lowering the electric potential of the blanking interval generating capacitor 40 increases in comparison with during no load or a light load, so the blanking interval is extended in comparison with during no load or a light load.

When the blanking interval is expanded to about 1.5 times the interval in which it is possible to prevent malfunctioning due to a capacitive spike current during a constant load, malfunctioning due to a capacitive spike current can be prevented even during a heavy load, so the blanking interval in the case that the switching transistor 51 is off is preferably adjusted to this.

The element current value during a light load condition with the switching transistor 51 off, in other words, the element current value (refer to FIG. 12) observed when the element current is controlled by the minimum pulse interval in the conventional switching power supply apparatus shown in FIG. 8, is about 30% of the element current value observed when the voltage value of the error voltage signal VEAO is clamped by the excess current protecting circuit 29. In view of the above, the reference voltage VCO1 of the load detecting comparator is preferably set to about 30% of the maximum voltage value of the error voltage signal VEAO, in other words, to a value that is about 30% of the value clamped by the excess current protecting circuit 29 (the value that is about the voltage value of the error voltage signal observed when the element current is controlled by the minimum pulse interval). Adopting this approach makes it possible to prevent the element current from being controlled by the minimum pulse interval during no load or a light load.

According to this first structural example as described above, the amount of current outflow from the blanking interval generating capacitor can be increased during no load or a light load, and the blanking interval can be shortened by increasing the rate at which the electric potential decreases; and the blanking time can be lengthened by reducing the amount of current outflow during a heavy load, so the element current that flows to the switching element can be controlled in a regular manner.

In this first structural example, an N-type transistor for allowing current to flow from the blanking interval generating capacitor was additionally provided in order to increase the current that flows to the mirror circuit during no load or a light load, but a plurality of these may naturally be provided.

The formation area 20 on the substrate comprises a primary side, in other words, a switching element 14 and a control circuit 15 on the input side, so a single package or a single chip can be easily formed as a semiconductor integrated circuit. Because the number of components can be reduced by forming a single package or a single chip, the main body of the power supply apparatus can be made smaller, and costs can also be reduced.

The second structural example of the on-blanking pulse generating circuit related to the present embodiment is subsequently described below with reference to FIG. 4. The same symbols are given to members that correspond to the members described based on FIG. 2, and their description is omitted.

The on-blanking pulse generating circuit is different from the first structural example on the point that the capacitance value of the blanking interval generating capacitor varies in two steps in accordance with the load condition. In other words, the on-blanking pulse generating circuit adjusts in two steps the decrease rate of the electric potential of the blanking interval generating capacitor by adjusting in two steps the capacitance of the blanking interval generating capacitor on the basis of the error voltage signal VEAO, and the blanking interval is adjusted in two steps.

Figure 4:
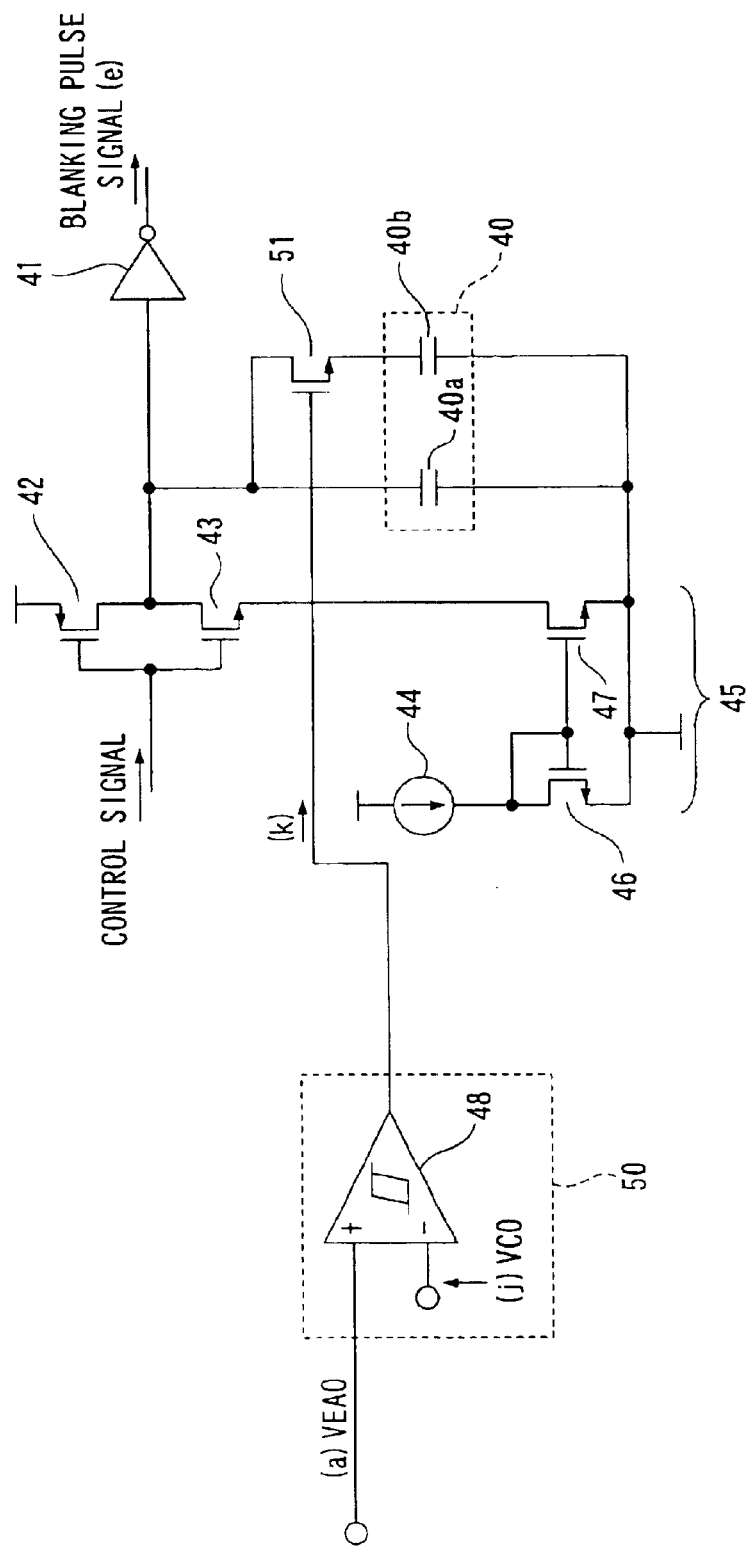
FIG. 4 is a circuit diagram showing an outline of a second structural example of the on-blanking pulse generating pulse circuit in the switching power supply apparatus related to an embodiment of the present invention.

The blanking interval generating capacitor 40 in the on-blanking pulse generating circuit is configured such that a first capacitor 40a and a second capacitor 40b are connected in parallel by way of the switching transistor (third switch element) 51, as shown in FIG. 4.

The switching transistor 51 opens and closes in accordance with the output signal of the load detecting circuit 50 (load detecting comparator 48). In other words, the load detecting circuit 50 adjusts the capacitance value of the blanking interval generating capacitor 40 by controlling the switching transistor 51 on the basis of the voltage value of the error voltage signal VEAO.

The load detecting circuit 50 of the on-blanking pulse generating circuit comprises the load detecting comparator 48.

With a configuration such as that described above, current flows from the blanking interval generating capacitor 40 in which the first capacitor 40a and the second capacitor 40b are connected in parallel so that current that is proportional to the current that flows from the constant current source 44 flows to the N-type transistor 47 when both the N-type transistor 43 and the switching transistor 51 are on in the on-blanking pulse generating circuit. Conversely, when the N-type transistor 43 is on and the switching transistor 51 is off, current flows solely from the first capacitor 40a such that current that is proportional to the current that flows from the constant current source 44 flows to the N-type transistor 47.

Thus, in the on-blanking pulse generating circuit, by controlling the opening and closing of the switching transistor 51 on the basis of the error voltage signal VEAO, it is possible to achieve a two-step variation for the capacitance value of the blanking interval generating capacitor 40, in other words, the decrease rate of the potential of the blanking interval generating capacitor 40, and, as a result, the blanking interval varies in two steps.

The operation of the on-blanking pulse generating circuit is described below.

The load detecting circuit 50 (load detecting comparator 48) compares the reference voltage VCO that has a hysteresis and the voltage of the error voltage signal VEAO to be input to the load detecting comparator 48, outputs a LOW signal when the voltage of the error voltage signal VEAO is lower than the reference voltage VCO, and turns the switching transistor 51 off. Conversely, when the error voltage signal VEAO is higher than the reference voltage VCO, the load detecting circuit 50 turns the switching transistor 51 on.

In view of the above, the reference voltage VCO is set so that the switching transistor 51 is turned on during no load or a light load, and is turned off during a constant load or a heavy load. In other words, the capacitance value of the blanking interval generating capacitor 40 is decreased so that the blanking interval is shorter during no load or a light load, and the capacitance value is increased so that the blanking interval is extended.

When the switching element 14 is turned on, a HIGH signal is output from the gate driver 28, the P-type transistor 42 is turned off, and the N-type transistor 43 is turned on.

As long as the condition is a constant load or a heavy load (the switching transistor 51 is in an ON condition), current that is proportional to the current through the constant current source 44 flows from the blanking interval generating capacitor 40, which comprises a first capacitor 40a and a second capacitor 40b connected in parallel, to the N-type transistor 47 due to the mirror effect.

Also, as long as the condition is a no load or light load condition (the switching transistor 51 is in an OFF condition), current that is proportional to the current through the constant current source 44 flows solely from the first capacitor 40a to the N-type transistor 47 due to the mirror effect.

As a result, during no load or a light load, the rate at which the electric potential of the blanking interval generating capacitor 40 decreases is higher than during a constant load or a heavy load because the capacitance value of the blanking interval generating capacitor 40 decreases. The time until reaching the threshold value voltage of the inverter 41 is therefore shorter than during a constant load or a heavy load, and, as a result, the blanking interval is also shorter.

Thus, the capacitance value of the blanking interval generating capacitor 40 varies in two steps in accordance with the load condition, so the blanking interval also varies in two steps.

Figure 5:
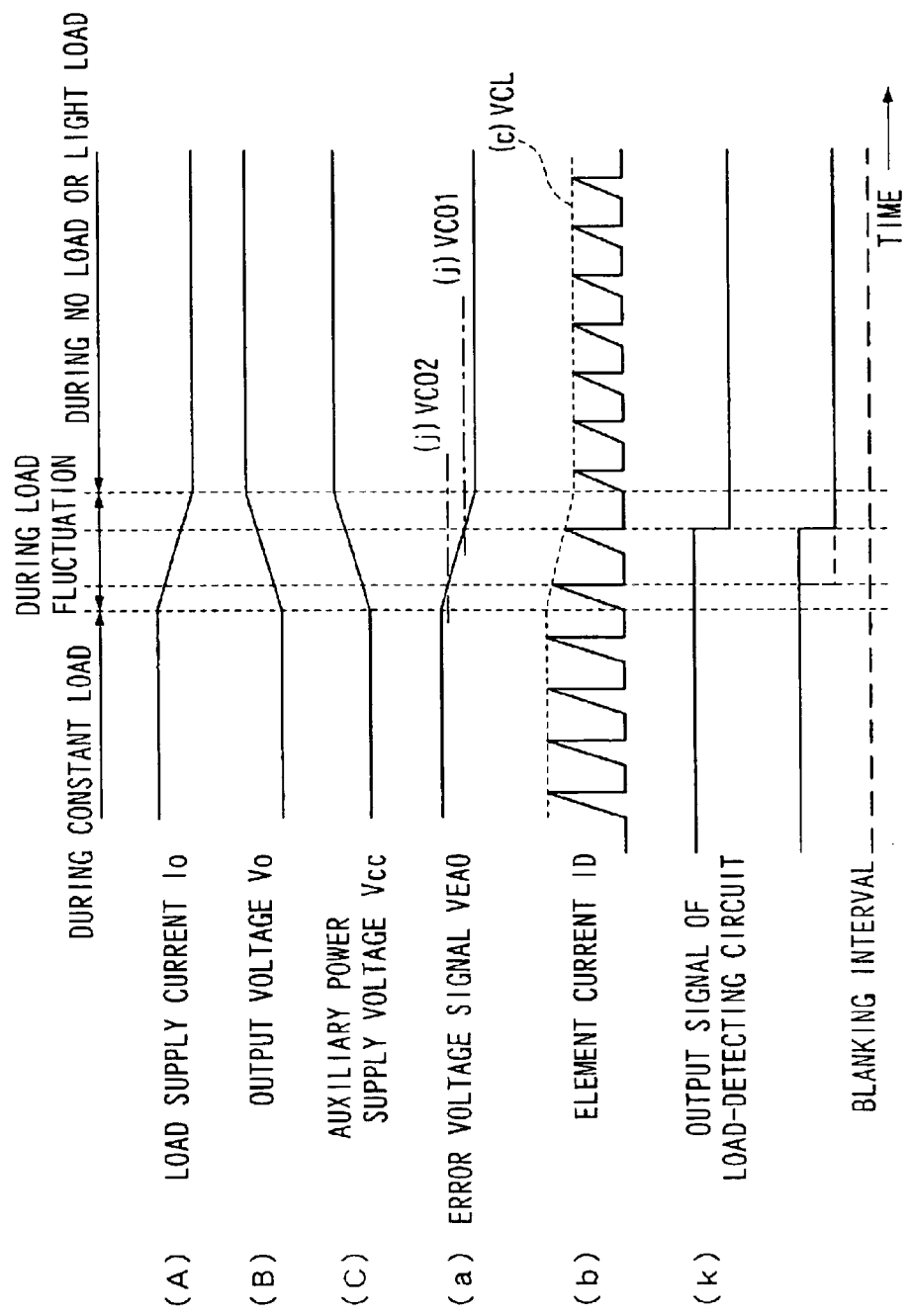
FIG. 5 is a second timing chart that describes the operation during load fluctuations of the switching power supply apparatus related to an embodiment of the present invention.

Operation during a load change in the switching power supply device is subsequently described with reference to the timing chart shown in FIG. 5. FIG. 5 is a timing chart of when the load changes from a constant-load condition to a no-load condition or a light-load condition (condition in which the amount of current that flows from the output voltage generating circuit 16 to the load 18 is decreasing in comparison with during a constant load).

When the load changes from a constant-load condition to a no-load condition or a light-load condition, in other words, when the load supply current Io (A) decreases, as shown in FIG. 5, the output voltage Vo (B) slightly increases. In response to this, the auxiliary power supply voltage Vcc (C) that is generated by the auxiliary power supply circuit 19 also increases, and the voltage of the error voltage signal VEAO (a) from the error amplifier 22 decreases.

When the voltage of the error voltage signal VEAO (a) decreases, the element current ID (b) the flows through the switching element 14 decreases, and the element current detecting signal VCL (c) also decreases.

When the voltage of the error voltage signal VEAO (a) decreases and becomes less than the reference voltage VCO1 applied to the load detecting comparator 48, the output signal (k) of the load detecting circuit 50 becomes a LOW signal, the switching transistor 51 is turned off, and the capacitance value of the blanking interval generating capacitor 40 decreases in comparison with when at a constant load or a heavy load, so the blanking interval is shortened in comparison with when at a constant load or a heavy load.

Conversely, when the load condition changes from a constant-load condition to a no-load condition or a light-load condition, the voltage of the error voltage signal VEAO (a) does increase. When the voltage of the error voltage signal VEAO (a) becomes greater than the reference voltage VCO2 applied to the load detecting comparator 48, the switching transistor 51 is turned off, and the capacitance value of the electric potential of the blanking interval generating capacitor 40 increases in comparison with during no load or a light load, so the blanking interval is extended in comparison with during no load or a light load.

According to the second structural example as described above, the capacitance value of the blanking interval generating capacitor can be increased during no load or a light load, the blanking interval can be shortened by increasing the rate at which the electric potential thereof decreases, and the blanking time can be lengthened by increasing the capacitance value during a heavy load, so the element current that flows to the switching element can be controlled in a regular manner.

In the second structural example, the blanking interval generating capacitor is constructed by connecting two capacitors in parallel in order to reduce the capacitance value of the blanking interval generating capacitor, but the configuration is naturally not limited to two capacitors.

The third structural example of the on-blanking pulse generating circuit related to the present embodiment is subsequently described below with reference to FIG. 6. The same symbols are given to members that correspond to the members described based on FIG. 2, and their description is omitted.

The on-blanking pulse generating circuit is different from the first structural example on the point that the outflow rate of the current from the blanking interval generating capacitor varies linearly in accordance with the load condition. In other words, the on-blanking pulse generating circuit linearly adjusts the rate at which the electric potential of the blanking interval generating capacitor decreases, and linearly adjusts the blanking interval as a result of the fact that a blanking interval adjusting circuit 71 linearly adjusts the outflow rate of the current from the blanking interval generating capacitor in accordance with the voltage value of the error voltage signal VEAO.

Figure 6:
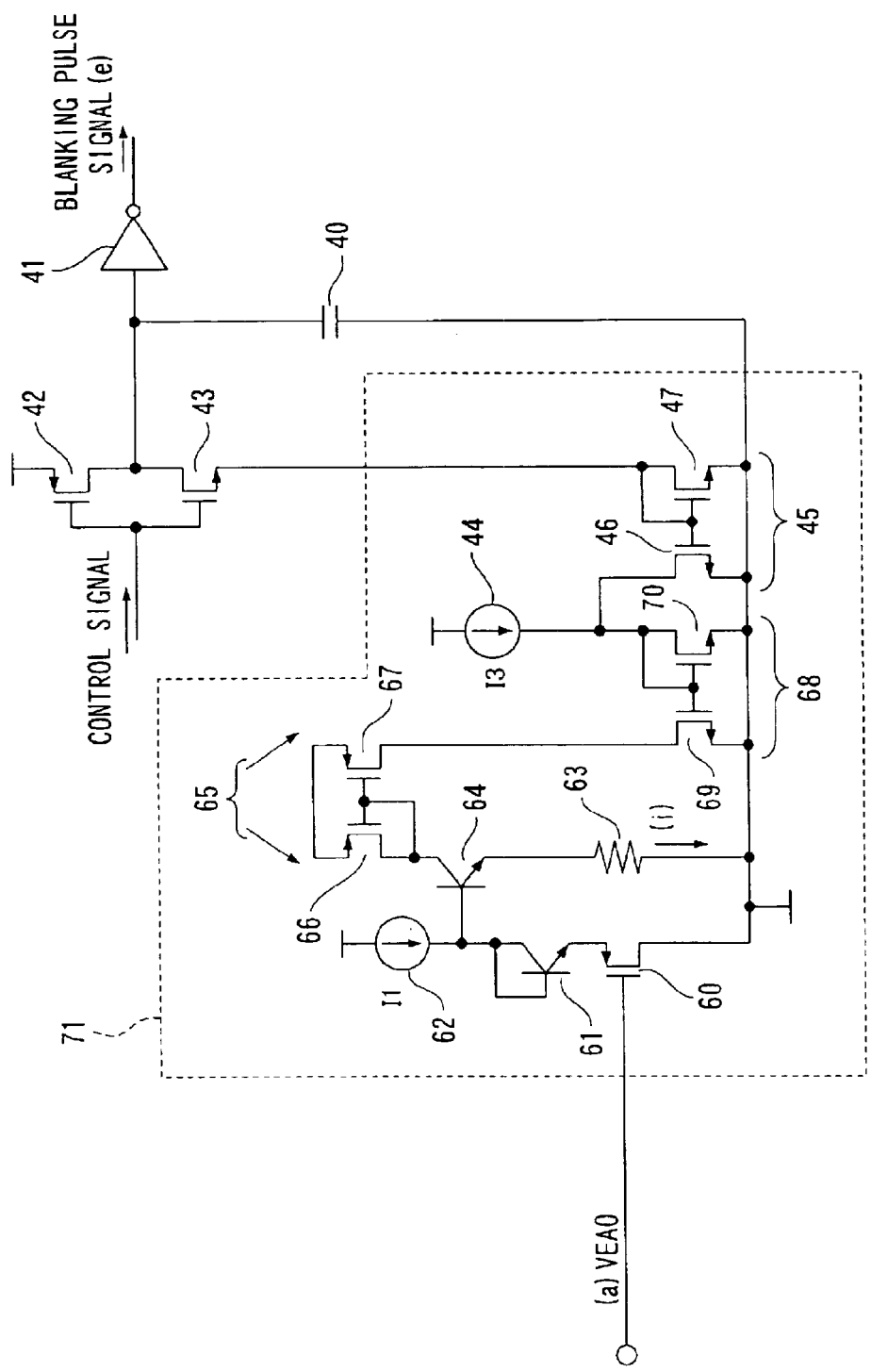
FIG. 6 is a circuit diagram showing an outline of a third structural example of the on-blanking pulse generating pulse circuit in the switching power supply apparatus related to an embodiment of the present invention.

In the P-type transistor 60, the gate voltage varies in accordance with the voltage value of the error voltage signal VEAO, which comprises the difference between the reference voltage and the power supply voltage VCC for the control circuit that is fed back and generated based on the output voltage Vo, as shown in FIG. 6. The drain terminal of the P-type transistor 60 is connected to the ground of the control circuit 15, and the source terminal is connected to the constant current supply 62 by way of an NPN-type bipolar transistor 61.

Therefore, the base current of an NPN-type bipolar transistor 64 whose base terminal is connected to the constant current supply 62 also varies in accordance with the voltage value of the error voltage signal VEAO, and the amount of current of the current (i) through a resistance 63 also varies in accordance with the voltage value of the error voltage signal VEAO.

The drain terminal of an N-type transistor 66 is connected to the collector terminal of the NPN-type bipolar transistor 64. The N-type transistor 66 and an N-type transistor 67 form a mirror circuit 65.

The drain terminal of the N-type transistor 67 is connected with the drain terminal of an N-type transistor 69. This N-type transistor 69 and an N-type transistor 70 form a mirror circuit 68.

The amount of current that flows to the N-type transistor 70 therefore also varies in accordance with the voltage value of the error voltage signal VEAO due to the mirror effect of the mirror circuits 65 and 68. As a result, the amount of current that flows from the constant current source 44 to the N-type transistor 46 also varies in accordance with the voltage value of the error voltage signal VEAO.

Thus, the on-blanking pulse generating circuit linearly controls the outflow rate of the current from the blanking interval generating capacitor by linearly varying the current that flows from the constant current source 44 to the N-type transistor 46 in accordance with the voltage value of the error voltage signal VEAO.

The voltage of the error voltage signal VEAO decreases during no load or a light load, for example. When the voltage of the error voltage signal VEAO decreases, the gate voltage of the P-type transistor 60 decreases by the same amount, and the amount of current that flows to the P-type transistor 60 increases. The constant current source 62 provides a fixed current, so the base current of the NPN-type bipolar transistor 64 decreases. For this reason, the amount of current of the current (i) that flows to the resistance 63 also decreases. Here, the amount of current that flows to the N-type transistor 70 also decreases due to the mirror effect of the mirror circuits 65 and 68, but because the constant current source 44 supplies a fixed current, the amount of current that flows to the N-type transistor 46 increases. When the amount of current that flows to the N-type transistor 46 increases, the outflow rate of current from the blanking interval generating capacitor 40 increases due to the mirror effect of the mirror circuit 45, the decrease rate of the electric potential of the blanking interval generating capacitor 40 is increased, and the blanking interval becomes shorter.

Conversely, because the voltage of the error voltage signal VEAO increases during a heavy load, the amount of current that flows from the blanking interval generating capacitor 40 decreases, the decrease rate of the electric potential of the blanking interval generating capacitor 40 becomes lower, and the blanking interval is extended.

In the on-blanking pulse generating circuit configured in such a manner, the outflow rate of current from the blanking interval generating capacitor is varies linearly in accordance with the voltage value of the error voltage signal VEAO, in other words, in accordance with the load condition, and, as a result, the blanking interval varies linearly in accordance with the load condition.

Figure 7:
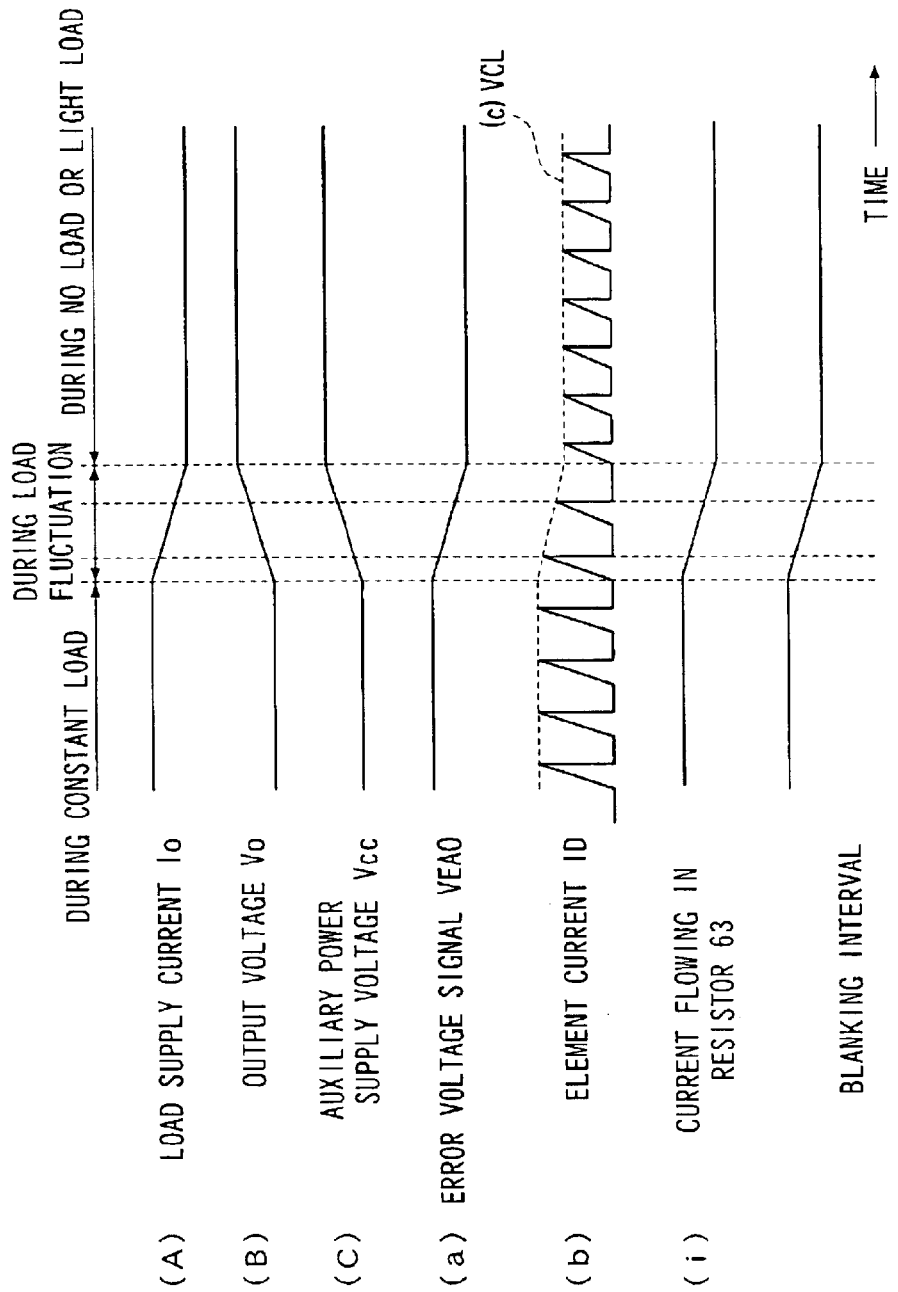
FIG. 7 is a third timing chart that describes the operation during load fluctuations of the switching power supply apparatus related to an embodiment of the present invention.

Operation during a load change in the switching power supply device is subsequently described with reference to the timing chart shown in FIG. 7. FIG. 7 is a timing chart of when the load changes from a constant-load condition to a no-load condition or a light-load condition (condition in which the amount of current that flows from the output voltage generating circuit 16 to the load 18 is decreasing in comparison with during a constant load).

When the load changes from a constant-load condition to a no-load condition or a light-load condition, as shown in FIG. 7, the voltage value of the error voltage signal VEAO decreases in accordance with the load condition thereof, and the current (i) that flows to the resistance 63 also decreases in the same manner in accordance with the voltage value of this error voltage signal VEAO. Therefore, the blanking interval becomes shorter in accordance with the voltage value of the error voltage signal VEAO.

According to this third structural example as described above, the blanking interval can be linearly varied during all load conditions, from those existing during no load or a light load to those existing during a heavy load, and the switching element can be controlled in a regular manner.

With the switching power supply apparatus related to the present invention as described above, the blanking interval can be varied in accordance with the load condition, so an optimal blanking interval can be obtained for an entire range of loads.

Hence, because it is possible to shorten the blanking interval during standby, or other times of no load or a light load, control can be achieved on the basis of the feedback signal (the auxiliary power supply voltage VCC) during no load or a light load, and the output voltage can be stabilized at a prescribed voltage.

It is also possible to prevent malfunctioning due to a capacitive spike current that is produced when the switching element is turned on even during a heavy load, so the output voltage can be stabilized at a prescribed voltage.

Furthermore, the efficiency of the power supply does not decrease because the use of dummy resistance in not required.

What is claimed is:

1. A switching power supply apparatus comprising a switching element, a control circuit for controlling a switching operation of the switching element, a transformer for converting an inputted first DC voltage into an AC electric power by means of the switching operation of the switching element and outputting the AC electric power, an output voltage generating circuit for generating a second DC voltage from the AC electric power and outputting the voltage to an external load, and a power supply circuit for generating a DC voltage corresponding to the second DC voltage and setting the generated DC voltage as a power supply voltage of the control circuit, wherein said control circuit comprising:

an oscillator for generating a switching signal that induces a switching operation in the switching element, an element current detecting circuit for detecting element current that flows through the switching element and outputting the current as an element current detecting signal, an error amplifier for generating and outputting an error voltage signal as a voltage value that corresponds to a difference between a reference voltage and the power supply voltage, an element current detecting comparator for comparing the voltage value of the error voltage signal and that of the element current detecting signal, and outputting a comparison signal that corresponds to a comparison result thereof, a switching signal control circuit for controlling the switching signal so that the second DC voltage is brought to a prescribed voltage on a basis of the comparison signal from the element current detecting comparator, and outputting this as a control signal to the switching element, and an on-blanking pulse generating circuit for generating a blanking pulse signal that disables, based on the voltage value of the error voltage signal, the comparison signal from the element current detecting comparator for a period corresponding to a load condition starting from a moment when the switching element is turned on, and ensuring that the switching element is not turned off during the period.

2. The switching power supply apparatus according to claim 1, wherein the on-blanking pulse generating circuit comprises:

a blanking interval generating capacitor;

a blanking pulse signal generating circuit for generating the blanking pulse signal that disables the comparison signal from the element current detecting comparator until the electric potential of the blanking interval generating capacitor reaches a threshold value;

a mirror circuit that is connected to a constant current source and is capable of varying the outflow rate of the current from the blanking interval generating capacitor in two steps;

a first switch element for connecting the mirror circuit and the blanking interval generating capacitor and allowing current to flow from the blanking interval generating capacitor when a control signal for turning on the switching element is received from the switching signal control circuit;

a load-detecting circuit for comparing the voltage value of the error voltage signal and the reference voltage, and outputting a comparison signal that corresponds to the comparison result thereof; and a second switch element for varying the outflow rate of the current from the blanking interval generating capacitor in two steps in accordance with the comparison signal from the load-detecting device.

3. The switching power supply apparatus according to claim 1, wherein the on-blanking pulse generating circuit comprises:

a blanking interval generating capacitor capable of varying the capacitance value in two steps;

a blanking pulse signal generating circuit for generating the blanking pulse signal that disables the comparison signal from the element current detecting comparator until the electric potential of the blanking interval generating capacitor reaches a threshold value;

a mirror circuit for connecting to a constant current source;

a first switch element for connecting the mirror circuit and the blanking interval generating capacitor and allowing current to flow from the blanking interval generating capacitor when a control signal for turning on the switching element is received from the switching signal control circuit;

a load-detecting circuit for comparing the voltage value of the error voltage signal and the reference voltage, and outputting a comparison signal that corresponds to the comparison result thereof; and a third switch element for varying the capacitance value of the current from the blanking interval generating capacitor in two steps in accordance with the comparison signal from the load- detecting device.

4. The switching power supply apparatus according to claim 2, wherein the reference voltage of the load-detecting circuit is set to the voltage value of the error voltage signal generated when the element current value is controlled by the minimum pulse interval.

5. The switching power supply apparatus according to claim 3, wherein the reference voltage of the load-detecting circuit is set to the voltage, value of the error voltage signal generated when the element current value is controlled by the minimum pulse interval.

6. The switching power supply apparatus according to claim 1, wherein the on-blanking pulse generating circuit comprises:

a blanking interval generating capacitor;

a mirror circuit for connecting to a constant current source;

a first switch element for connecting the mirror circuit and the blanking interval generating capacitor and allowing current to flow from the blanking interval generating capacitor when a control signal for turning on the switching element is received from the switching signal control circuit; and a blanking interval adjusting circuit for linearly varying the current value flowing to the mirror circuit from the constant current source in accordance with the voltage value of the error voltage signal, and linearly adjusting the outflow rate of the current from the blanking interval generating capacitor.

7. The switching power supply apparatus according to claim 1, wherein the switching element and the control circuit are integrated and formed on a single semiconductor substrate, with the output terminal and input terminal of the switching element and the input terminal of the control circuit to which a feedback signal is input serving as external connection terminals.

* * * * *